United States Patent
Kim et al.

(10) Patent No.: US 9,769,651 B2
(45) Date of Patent: Sep. 19, 2017

(54) PORTABLE TERMINAL DEVICE AND METHOD FOR OPERATING THE SAME

(71) Applicant: Samsung Electronics Co. Ltd., Suwon-si, Gyeonggi-do (KR)

(72) Inventors: Do-hyoung Kim, Seoul (KR); Sang-il Lee, Seongnam-si (KR); Taik-heon Rhee, Seoul (KR); Seong-hoon Kang, Suwon-si (KR); Sung-bin Kuk, Suwon-si (KR); Dong-jin Eun, Bucheon-si (KR); Min-kyu Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 154 days.

(21) Appl. No.: 13/963,393

(22) Filed: Aug. 9, 2013

(65) Prior Publication Data

US 2014/0045484 A1    Feb. 13, 2014

(30) Foreign Application Priority Data

Aug. 10, 2012    (KR) .................... 10-2012-0087920

(51) Int. Cl.

| H04W 8/24 | (2009.01) |
| H04N 21/2343 | (2011.01) |
| H04N 21/41 | (2011.01) |
| H04N 21/4722 | (2011.01) |
| H04N 21/81 | (2011.01) |

(52) U.S. Cl.
CPC ...... *H04W 8/24* (2013.01); *H04N 21/234318* (2013.01); *H04N 21/4122* (2013.01); *H04N 21/4126* (2013.01); *H04N 21/4722* (2013.01); *H04N 21/8133* (2013.01); *H04N 21/8153* (2013.01)

(58) Field of Classification Search
CPC ................ H04W 8/24; H04N 21/4307; H04N 21/42209; G06F 17/30126; G06F 3/0481; G06F 17/30991; G06F 3/04812
USPC ........ 455/420, 566, 556.2; 711/162; 703/23; 348/838; 345/632, 8, 633; 709/217
See application file for complete search history.

(56) References Cited

U.S. PATENT DOCUMENTS

| 8,139,087 B2 * | 3/2012 | Kuroki ................. G06T 19/006 345/419 |
| 8,611,601 B2 * | 12/2013 | Calman ............. G06K 9/00221 382/103 |
| 8,843,358 B2 * | 9/2014 | Newell ......................... 703/23 |

(Continued)

FOREIGN PATENT DOCUMENTS

| EP | 1 505 825 A1 | 2/2005 |
| EP | 1 724 695 A1 | 11/2006 |

(Continued)

*Primary Examiner* — Lester Kincaid
*Assistant Examiner* — Gary Lafontant
(74) *Attorney, Agent, or Firm* — Jefferson IP Law, LLP

(57) ABSTRACT

A portable terminal device and a method for operating the same are provided. The portable terminal device includes a communicator configured to perform communication with an external device, a display configured to display a same image as an image displayed on the external device, an inputter configured to receive an input of a selection command, and a controller configured to perform an operation corresponding to an object included in the image at a time when the selection command is input.

22 Claims, 12 Drawing Sheets

(56) References Cited

U.S. PATENT DOCUMENTS

| | | | |
|---|---|---|---|
| 2002/0058536 A1* | 5/2002 | Horii et al. | 455/566 |
| 2004/0056985 A1* | 3/2004 | Seong | 348/838 |
| 2008/0151126 A1 | 6/2008 | Yu | |
| 2008/0208839 A1 | 8/2008 | Sheshagiri et al. | |
| 2010/0169595 A1* | 7/2010 | Bryant-Rich | 711/162 |
| 2011/0164175 A1 | 7/2011 | Chung et al. | |
| 2011/0201322 A1 | 8/2011 | Sun et al. | |
| 2012/0017236 A1 | 1/2012 | Stafford et al. | |
| 2012/0038541 A1 | 2/2012 | Song et al. | |
| 2012/0088548 A1 | 4/2012 | Yun et al. | |
| 2012/0200571 A1 | 8/2012 | Newell | |
| 2012/0276954 A1* | 11/2012 | Kowalsky | 455/556.2 |
| 2012/0302167 A1* | 11/2012 | Yun | G06F 3/04883 455/41.2 |

FOREIGN PATENT DOCUMENTS

| | | |
|---|---|---|
| EP | 2 169 949 A1 | 3/2010 |
| JP | 2012095157 A * | 5/2012 |
| KR | 10-2011-0136589 A | 12/2011 |
| WO | 03/096669 A2 | 11/2003 |
| WO | 2011/053271 A1 | 5/2011 |
| WO | 2012/099558 A1 | 7/2012 |

* cited by examiner

FIG. 4A
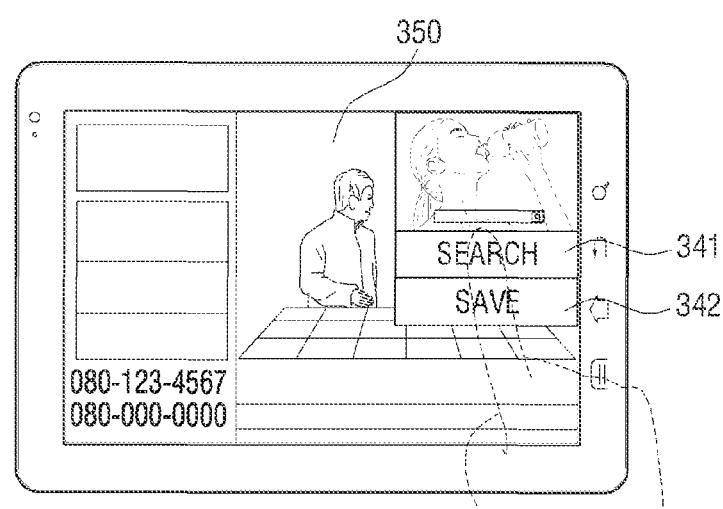
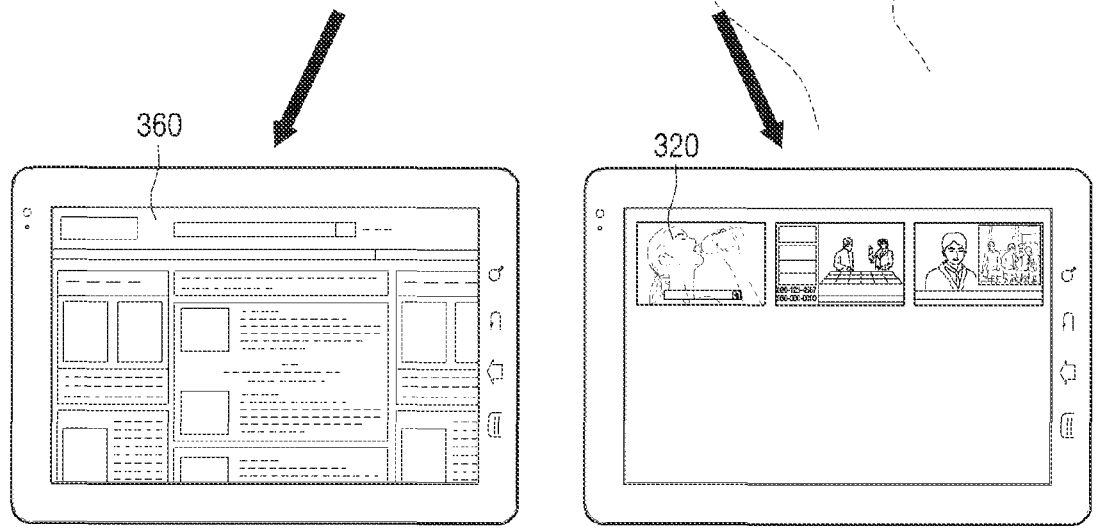
FIG. 4B             FIG. 4C

PORTABLE TERMINAL DEVICE AND METHOD FOR OPERATING THE SAME

CROSS-REFERENCE TO RELATED APPLICATIONS

This application claims the benefit under 35 U.S.C. §119(a) of a Korean patent application filed on Aug. 10, 2012 in the Korean Intellectual Property Office and assigned Serial No. 10-2012-0087920, the entire disclosure of which is hereby incorporated by reference.

TECHNICAL FIELD

The present disclosure relates to a portable terminal device and a method for operating the same. More particularly, the present disclosure relates to a portable terminal device and a method for operating the same, which can perform work related to images being displayed.

BACKGROUND

With the development of multimedia devices, such as smart televisions (TVs) and smart phones, users can enjoy various content services using the multimedia devices.

More particularly, a user can be provided with detailed contents of information, which is provided through a video device such as a smart TV, through an additional device such as a smart phone. However, in order to receive such services, the user must directly operate the additional device to receive the detailed contents of the information that is provided through the video device, and this may cause inconvenience to the user. Further, since the user directly operates the additional device to receive the detailed information on the information that is provided through the video device, viewing of an image that is currently reproduced in real time through the video device may be interfered with.

For example, a user may be concerned about a character that appears in a drama while viewing the drama through a smart TV. In this case, the user can manually input a search inquiry for the character in the drama, which is currently being reproduced on the smart TV, using a smart phone, and thus user convenience is deteriorated. Further, since the search inquiry for the character in the drama, which is currently being reproduced on the smart TV, is manually input, the user's ability to concentrate upon the viewing of the drama that is currently being reproduced on the smart TV may be lowered.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a portable terminal device, which interlocks with an external device to facilitate the processing of a user's selection command.

In accordance with an aspect of the present disclosure, a portable terminal device is provided. The portable terminal device includes a communicator configured to perform communication with an external device, a display configured to display a same image as an image displayed on the external device, an inputter configured to receive an input of a selection command, and a controller configured to perform an operation corresponding to an object that is included in the image at a time when the selection command is input.

The portable terminal device according to an aspect of the present disclosure may further include a storage, wherein the controller generates a captured image of the image at the time when the selection command is input and stores the captured image in the storage.

The display may display a task execution menu including the captured image and menus corresponding to at least one object that is included in the captured image on one area of a screen, and if one of the menus included in the task execution menu is selected, the controller performs an operation corresponding to the selected menu.

The controller may control the display to display the task execution menu that includes a search menu if a search window object is included in the captured image and to display a search screen if the search menu is selected.

The controller may display the task execution menu that includes a call connection menu if a phone number is included in the captured image, and attempt a call connection using the phone number if the call connection menu is selected.

The controller may control the display to display the task execution menu that includes a search menu for an image or a text if the image or the text is included in the captured image, and to perform a search for the image or the text and to display the result of the search if the search menu is selected.

The controller may detect an object that is displayed in an area designated according to the selection command in the image.

The controller may control the display to display a search screen if the detected object is a search window object.

The controller may attempt a call connection using a phone number if the detected object is the phone number.

The controller may perform a search for an image or a text if the detected object is the image or the text, and control the display to display the result of the search.

The display may display a plurality of captured images stored in the storage on the screen according to a user command, and display a task execution menu including the selected captured image and menus corresponding to at least one object that is included in the captured image on one area of a screen if one of the plurality of captured images is selected.

The controller may automatically delete the captured image if the captured image exceeds a predetermined threshold period from the storage with reference to storage history information of the captured images stored in the storage.

In accordance with another aspect of the present disclosure, a method for performing an operation corresponding to a user's selection command in a portable terminal device that interlocks with an external device is provided. The method includes displaying a same image as an image displayed on the external device, receiving an input of a selection command from a user, and performing an operation corresponding to an object that is included in the image at a time when the selection command is input.

The method for performing an operation according to the aspect of the present disclosure may further include generating a captured image of the image at the time when the selection command is input and storing the captured image.

The performing of the operation may include displaying a task execution menu including the captured image and menus corresponding to at least one object that is included in the captured image on one area of a screen, and if one of the menus included in the task execution menu is selected, performing an operation corresponding to the selected menu.

The performing of the operation may display the task execution menu that includes a search menu if a search window object is included in the captured image and display a search screen if the search menu is selected, display the task execution menu that includes a call connection menu if a phone number is included in the captured image and attempt a call connection using the phone number if the call connection menu is selected, and display the task execution menu that includes a search menu for an image or a text if the image or the text is included in the captured image and perform a search for the image or the text and display the result of the search if the search menu is selected.

The performing of the operation may include detecting an object that is displayed in an area designated according to the input selection command and performing the operation corresponding to the detected object if the selection command is input in the image.

The performing of the operation may display a search screen if the detected object is a search window object, attempt a call connection using a phone number if the detected object is the phone number, and perform a search for an image or a text and display the result of the search if the detected object is the image or the text.

The method for performing an operation according to the aspect of the present disclosure may further include displaying a plurality of pre-stored captured images on the screen if a stored image execution command is input, and displaying a task execution menu which includes the selected captured image and menus corresponding to at least one object that is included in the captured image on one area of a screen if one of the plurality of captured images is selected.

The method for performing an operation according to the aspect of the present disclosure may further include automatically deleting the captured image that exceeds a predetermined threshold period with reference to storage period information of the pre-stored captured images.

In accordance with another aspect of the present disclosure, a portable terminal device is provided. The portable terminal device includes a communicator configured to receive a picture that is displayed on an external device, a display configured to display the received picture, an inputter configured to receive an input of a user command for selecting an object that is included in the picture displayed on the display, and a controller configured to control the display to display a task execution menu for the object selected by the user command.

The received picture may be a captured image of the picture corresponding to a time when a selection command is input through the inputter among pictures displayed on the external device, and the controller may perform scaling of the captured image with a predetermined picture size.

The task execution menu may include menus for performing execution and storage of the object selected by the user command, and the controller may perform an operation corresponding to the selected menu if at least one of the menus included in the task execution menu is selected.

In accordance with another aspect of the present disclosure, a method for performing an operation corresponding to a user's selection command in a portable terminal device that interlocks with an external device is provided. The method includes receiving a picture that is displayed on an external device, displaying the received picture, an receiving an input of a user command for selecting an object that is included in the displayed picture, and displaying a task execution menu for the object selected by the user command.

The received picture may be a captured image of the picture corresponding to a time when a selection command is input through the inputter among pictures displayed on the external device, and the displaying may perform scaling of the captured image with a predetermined picture size and display the scaled captured image.

The task execution menu may include menus for performing execution and storage of the object selected by the user command, and the method for performing an operation may further include performing an operation corresponding to the selected menu if at least one of the menus included in the task execution menu is selected.

As described above, according to the present disclosure, since the portable terminal device that displays the same image as the image displayed on the external device can perform the result and the operation with respect to the image about which the user is concerned more promptly, the user convenience can be improved, and further the continuity of the images that are viewed through the external device can be guaranteed.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features and advantages of certain embodiments of the present disclosure will be more apparent from the following description taken in conjunction with the accompanying drawings, in which:

FIGS. 4A, 4B, and 4C are views explaining performing of an operation corresponding to a menu displayed on a screen of a portable terminal device according to an embodiment of the present disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
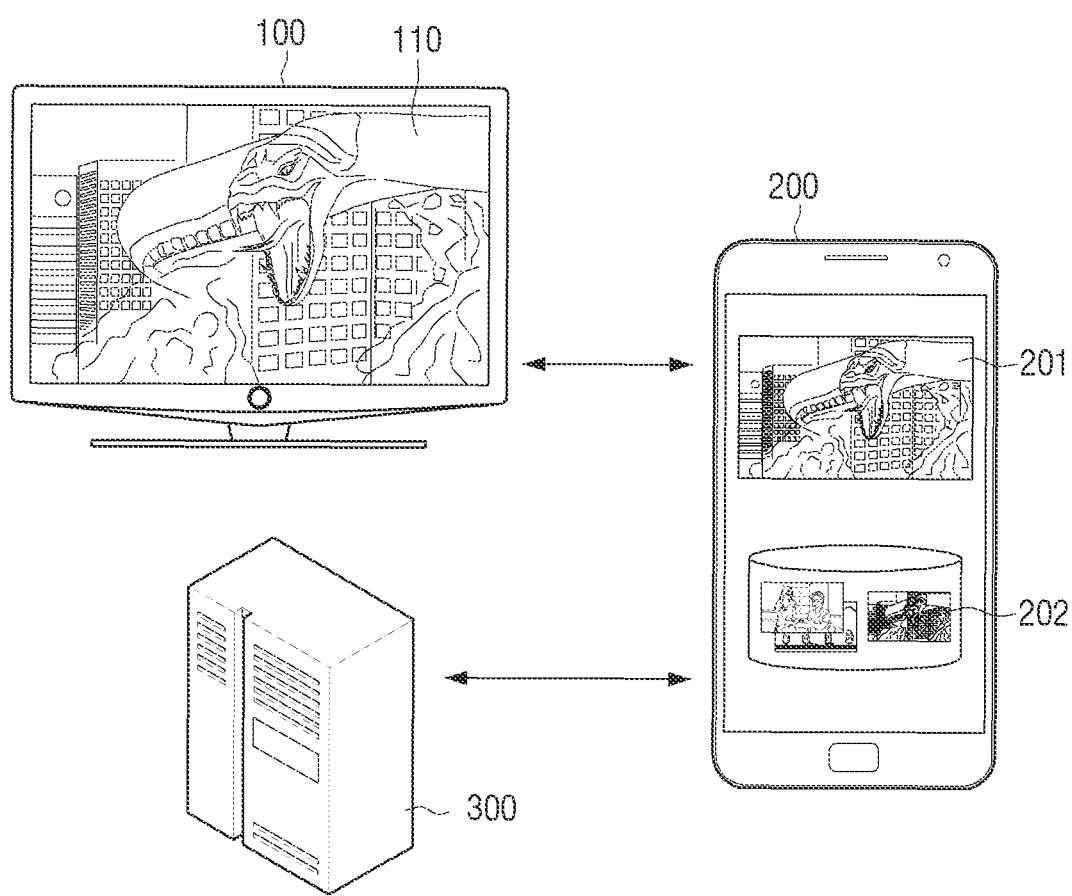
FIG. 1 is a view of a service providing system for concerned pictures in a displayed image according to an embodiment of the present disclosure.

FIG. 1 is a view of a service providing system for pictures in a displayed image according to an embodiment of the present disclosure.

Referring to FIG. 1, a service providing system includes an external device 100, a portable terminal device 200, and a web server 300. The external device 100 is a device that can perform wired/wireless communication, such as a smart TV, and further performs data communication with the portable terminal device 200 through wireless communication. The external device 100 processes an image signal received from an external transmission device to output an image 110, and transmits data of an output image 110 to the portable terminal device 200. Accordingly, the portable terminal device 200 can display on a screen the same image 201 as the image 110 that is displayed on the external device 100.

More specifically, the external device 100 may receive a satellite, cable, or ground-wave broadcasting signal from the external transmission device, or may receive an image signal through a source device, such as a web server, or a reproduction device, such as a Digital Versatile Disk (DVD) device, through at least one of CART, Audio-Visual (AV), High Definition Multimedia Interface (HDMI), component, and Universal Serial Bus (USB) interfaces, through a reception module (not illustrated). If the image signal is received through the reception module, the external device 100 may process the image signal that is received through an image processor (not illustrated), and output the video/audio type image. Since the technology to output the video/audio type image through signal processing of the image signal received from the outside is well known, the detailed description thereof will be omitted.

On the other hand, the external device 100, which outputs the received image signal as the video/audio type image, transmits image data that is currently output through the communicator (not illustrated) to the portable terminal device 200. Accordingly, the portable terminal device 200 can display the same image 201 as the image 110 that is currently displayed on the external device 100 on the screen.

A user may have an interest in the image 110 of the currently reproduced picture while viewing the image 110 through the external device 100 or the portable terminal device 200. As illustrated, the external device 100 and the portable terminal device 200 may reproduce the same image 110 or 201, and the user may be interested in a character that appears in the corresponding image 110 or 201 while viewing the image 110 or 201 through the external device 100 or the portable terminal device 200. Accordingly, the user may request a character search for the corresponding image 110 or 201 through the portable terminal device 200.

According to an embodiment, if the user is interested in a character that appears in the image 110 or 201, the user may select a predetermined input of the portable terminal device 200. However, the present disclosure is not limited thereto, and in an embodiment the user may touch the screen of the portable terminal device 200. If the input or the touch is made, the portable terminal device 200 generates and stores a captured image 202 of the scene corresponding to a time when the input button or the touch is made. At this time, it is preferable that the portable terminal device 200 detects at least one object included in the captured image 202 and stores the detected object together with the captured image 202. On the other hand, if the image 110 or 201 that is viewed through at least one of the external device 100 and the portable terminal device 200 is terminated, the user may still select the captured image 202 stored in the portable terminal device 200.

If such a selection command for the captured image 202 is input, the portable terminal device 200 displays a task execution menu that includes the captured image 202 selected by the user and menus corresponding to at least one object included in the corresponding captured image 202 on the screen. Thereafter, if at least one of the menus included in the task execution menu that is displayed on the screen is selected by the user, the portable terminal device 200 displays search result information of the object corresponding to the menu from the web server 300.

As described above, the portable terminal device 200 according to an embodiment of the present disclosure detects and stores the captured image 202 of the image 201 at the time when the user's selection command is input and the object included in the corresponding captured image. Accordingly, after the image 201 that is currently viewed is ended, the user can be provided with the search result information of the object corresponding to the concerned element among the objects included in the captured image 202 that is stored in the portable terminal device 200 through the portable terminal device 200. Accordingly, the user's inconvenience, which may be caused by forgetting of the concerned element occurring during viewing the image or searching for information on the corresponding concerned element with interception of viewing of the image that is currently being reproduced, can be solved. The user may thus perform a search on an object in the captured image 202 in which the user is interested, substantially without interrupting the viewing of the image 110 on the external device 100. The user may also thus perform the search and obtain search results without relying on memory and without writing down anything.

According to another embodiment, if the user is interested in a character appearing in the drama, the user can select the corresponding character from the image 201 that is displayed on the screen of the portable terminal device 200. If such a selection command is input, the portable terminal device 200 detects an object that is displayed in an area selected by the user. Thereafter, the portable terminal device 200 receives the search result information related to the corresponding object from the web server 300, and displays the search result information.

As described above, if the user's selection command is input, the portable terminal device 200 displays the search result information related to the object that is displayed in real time on the area selected by the user, and thus the user can be provided with the information on the image element in a state where the user views the image 201 through the portable terminal device 200 in real time while continuously viewing the image 110 that is currently been viewed through the external device 100.

Until now, the operation of the service providing system that includes the external device 100, the portable terminal device 200, and the web server 300 has been briefly described. Hereinafter, the operation of the above-described portable terminal device 200 will be described in detail.

Figure 2:
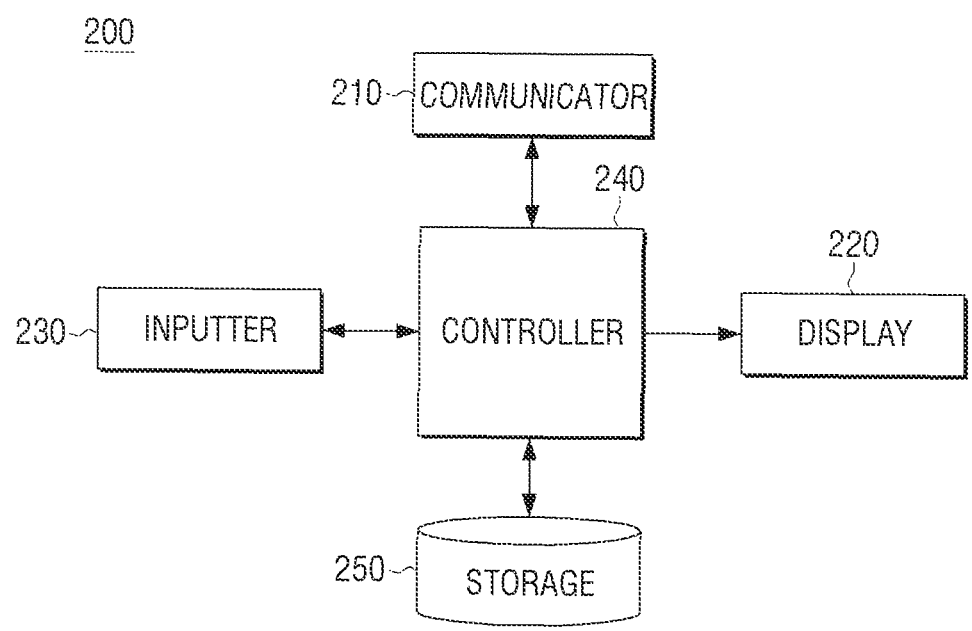
FIG. 2 is a block diagram of a portable terminal device according to an embodiment of the present disclosure.

FIG. 2 is a block diagram of a portable terminal device 200 according to an embodiment of the present disclosure.

Referring to FIG. 2, the portable terminal device 200 may be a terminal device that can perform wireless communication, such as a smart phone or a tablet Personal Computer (PC). The portable terminal device 200 includes a communicator 210, a display 220, an inputter 230, and a controller 240. The communicator 210 performs communication with the external device 100. For this, the communicator 210 may include various communication modules, such as a short-range wireless communication module (not illustrated) or a wireless communication module (not illustrated).

Here, the short-range wireless communication module is a communication module that performs wireless communication with the external device 100 that is positioned within a short distance, and may be, for example, Bluetooth or Zigbee. The wireless communication module is a module that is connected to an external network according to wireless communication protocols such as WiFi and the like, to perform communication. In addition, the wireless communication module may further include a mobile communication module that is connected to a mobile communication network according to various mobile communication standards, such as $3^{rd}$ Generation (3G), $3^{rd}$ Generation Partnership Project (3GPP), and Long Term Evolution (LTE), to perform communication.

The display 220 displays the image 201 that is received from the external device 100 through the communicator 210. Specifically, the display 220 may be implemented by Organic Light Emitting Diodes (OLED), a Liquid Crystal Display (LCD), or the like. The display 220 may be implemented in the form of a touch screen that forms a mutual layer structure with a touchpad, and the touch screen may be configured to detect a touch input position, area, and pressure of a touch input. The image 201 that is displayed on the screen through the display 220 is the same image as the image 110 that is currently being displayed on the external device 100. However, the present disclosure is not limited thereto, and the image 201 may be a pre-stored image or an image related to a broadcast that is received from an external broadcasting transmission device through a reception module (not illustrated).

The inputter 230 is an input means for receiving an input of a selection command according to various user operations and transferring the selection command to the controller 240. Here, the input panel may be in the form of a touch pad, a keypad having various kinds of function keys, numeral keys, special keys, character keys, or a touch screen.

The controller 240, which controls the overall operation of the communicator 210 and the display 220, perform an operation corresponding to an object that is included in the image 201 at a time when the selection command is input through the inputter 230. Further, if the user's selection command is input through the inputter 230, the controller 240 generates a captured image 202 of the image 201 at the time when the selection command is input and stores the captured image 202 in the storage 250. The storage for storing the captured image may be a nonvolatile memory, such as a flash memory.

If the user's selection command is input through the inputter 230, the controller 240 performs an operation corresponding to an object that is included in the image 201 at the time when the selection command is input. Specifically, if the user's selection command is input through the inputter 230, the controller 240 generates the captured image 202 of the image 201 at the time when the user's selection command is input, and stores the generated captured image 202 in the storage 250. However, the present disclosure is not limited thereto. If a storage command for the captured image 202 is input from the user, the controller 240 may store the captured image 202 in the storage 250. According to various embodiments, if the user's selection command is a command related to the generation of the captured image 202, the controller 240 may store the captured image 202 that is generated according to the user's selection command in the storage 250. On the other hand, if the user's selection command is a command related to the selection of a specific object that is included in the image 201, the controller 240 may store the generated captured image 202 in the storage 250 without any separate storage command.

Accordingly, If the user's selection command is input through the inputter 230, the controller 240 determines whether the input selection command is a command related to the generation of the captured image 202 or a command related to the selection of the specific object that is included in the image 201 while generating the captured image 202 of the image 201 at the time when the selection command is input.

If the user's selection command is a command related to capturing of the image 201 that is displayed through the display 220 as the result of the determination, the display 220 displays a task execution menu that includes the generated captured image 202 and menus corresponding to at least one object that is included in the corresponding captured image 202 on one area of the screen in accordance with a control command of the controller 240. Specifically, the controller 240 may detect the object that is included in the captured image 202 according to the following embodiment.

According to an embodiment, if the object that is included in the captured image 202 is a text image, the controller 240 may recognize the text image using an analysis algorithm, such as an Optical Character Reader (OCR). According to another embodiment, if the object that is included in the captured image 202 is a face image, the controller 240 may recognize the face image using an analysis algorithm, such as a Principal Component Analysis (PCA). According to still another embodiment, if the object that is included in the captured image 202 is a thing, the controller 240 may recognize the corresponding thing using an object tracking algorithm, such as an edge-based algorithm. At this time, the controller 240 may recognize the corresponding thing and a background using a color detection algorithm together with the object tracking algorithm. In the present disclosure, the object recognition algorithm has been briefly mentioned, but the present disclosure is not limited thereto. The object that is included in the captured image 202 may be recognized using other algorithms.

If at least one object that is included in the captured image 202 is detected through the object recognition algorithm, the controller 240 generates a task execution menu that includes a menu corresponding to the detected object. Accordingly, the display 220 can display the task execution menu that includes the generated captured image 202 and the menu corresponding to the object that is detected from the corresponding captured image 202 on one area of the screen as described above. Further, the display 220 may display the same image 201 as the image 110 that is currently being reproduced on the external device 100 on the remaining area. On the other hand, if one of the menus included in the task execution menu that is displayed on one area of the screen is selected by the user, the controller 240 may perform an operation corresponding to the selected menu.

According to an embodiment, a search window object may be included in the captured image 202 that is generated at the time when the selection command is input. As described above, if the search window object is included in the captured image 202, the controller 240 controls the display 220 to display the task execution menu that includes the search menu corresponding to the search window object. Accordingly, the display 220 displays the task execution menu that includes the search menu corresponding to the search window object on one area of the screen together with the captured image 202. Additionally, the display 220 may display a storage menu for storing the corresponding captured image 202 on the one area of the screen together with the task execution menu that includes the search menu corresponding to the search wind object.

As described above, if the task execution menu that includes the search menu and the storage menu that are displayed on the one area of the screen is displayed, the user may select at least one menu of the displayed menus. According to the various embodiments, if the search menu is selected, the display 220 displays the search screen corresponding to the search window object according to the control command of the controller 240. Accordingly, the user can receive the result of the search for the scene on which the concerned element occurs in the currently viewed image 201 through the search screen that is displayed on the screen.

On the other hand, if the storage menu is selected, the controller 240 stores the corresponding captured image 202 in the storage 250. As the captured image 202 is stored in the storage 250, the user can overcome the inconvenience which is caused by forgetting of the element of interest, the interest occurring during viewing the element image that occurs in the image 201 that is currently viewed or searching for information on the corresponding element with interception of viewing of the image 201 that is currently being reproduced.

Hereinafter, the above-described embodiment will be described in detail with reference to FIGS. 3A to 4C.

Figure 3A:
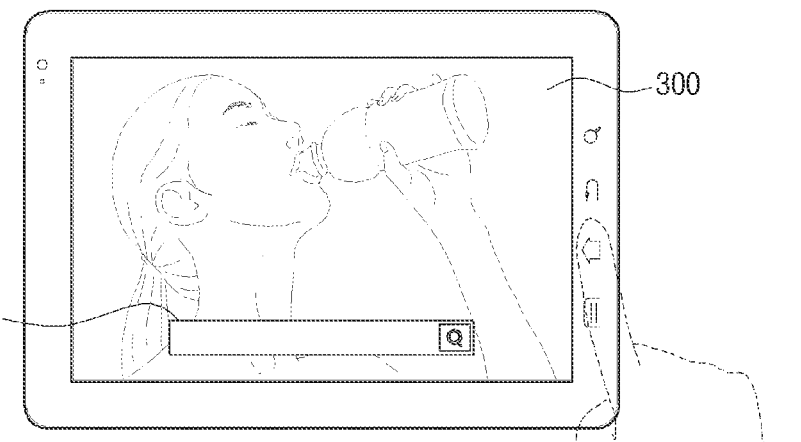
FIGS. 3A, 3B, and 3C are views explaining generation of a captured image and a menu in a portable terminal device according to an embodiment of the present disclosure.
Figure 3B:
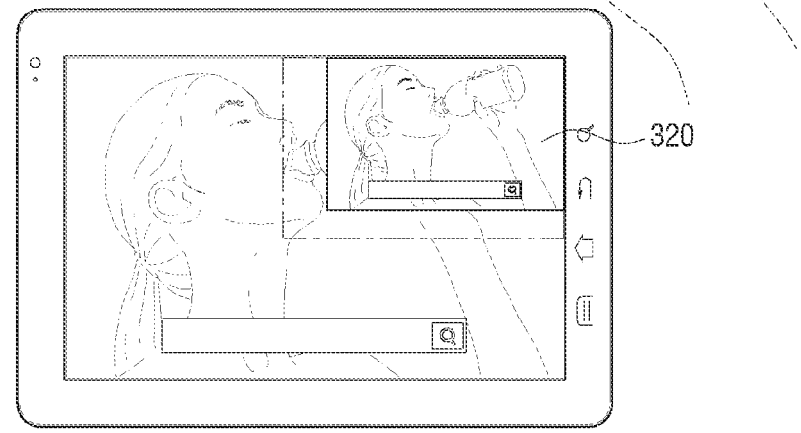
Figure 3C:
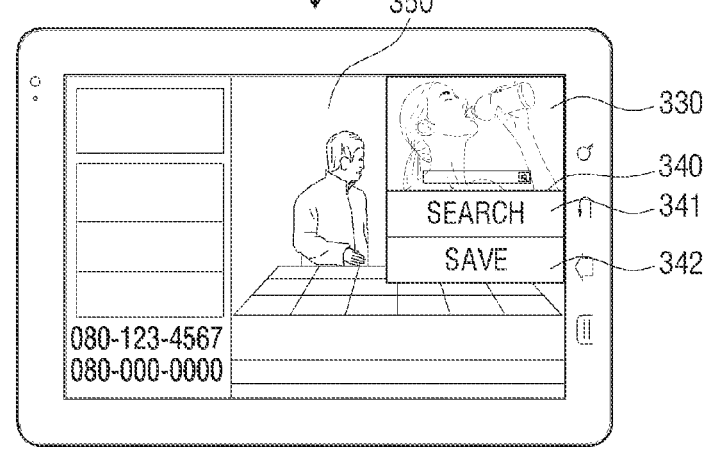

FIGS. 3A to 3C are views explaining generation of a captured image and a menu in a portable terminal device according to an embodiment of the present disclosure, and FIGS. 4A to 4C are views explaining performing an operation corresponding to a menu displayed on a screen of a portable terminal device according to an embodiment of the present disclosure.

Referring to FIG. 3A, the portable terminal device 200 may display the same image 300 as that displayed on the external device 100. The image 300 may be, for example, an advertisement for a product or service. Accordingly, the user can view the advertisement image 300 through at least one of the external device 100 and the portable terminal device 200. If the contents of the advertisement image 300 interest the user, then the user viewing the advertisement image 300 may select a menu button (not illustrated) or touch the screen on which the advertisement image 300 is displayed. If the selection command as described above is input, the controller 240 determines that the input selection command is a selection command related to capturing, and generates a captured image 320 of the advertisement image 300 at the time when the selection command is input from the user.

Thereafter, the controller 240 reduces a size of the generated captured image 320. Accordingly, referring to FIG. 3B, the captured image 320 is reduced to a predetermined size. If the size of the captured image 320 is reduced as described above, the display 220 displays a thumbnail image 330 of the reduced captured image 320 on one area of the screen. Accordingly, referring to FIG. 3C, the display 220 can display the reduced captured image 320 on, for example, the right upper end portion of the screen as the thumbnail image 330. Of course, the present disclosure is not limited thereto; for example, the controller 240 may determine and locate the reduced captured image 320 in an area of display 220 least likely to include content of interest, such as an area of least motion.

On the other hand, if the captured image 320 of the advertisement image 300 at the time when the selection command is input from the user is generated, the controller 240 may detect the object that is included in the captured image 320 through analysis of the captured image 320. As described above, the controller 240 may detect the object that is included in the captured image 320 through the object recognition algorithm. As described above, if the search window object 310 is detected through the object recognition algorithm, the controller 240 generates the task execution menu 340. Here, the task execution menu 340 may include a search menu 341 corresponding to the detected search window object 310 and a storage menu 342 for storing the captured image 320. Thereafter, the display 220 displays the task execution menu 340 on the one area of the screen together with the thumbnail image 330 of the captured image 320 in accordance with the control command of the controller 240.

Accordingly, referring to FIG. 3C, the display 220 may display the task execution menu 340 that includes the thumbnail image 330 of the captured image 320, the search menu 341 for the search window object 320 detected from the captured image 320, and the storage menu 342 for storing the captured image 320 on the right upper end area of the screen, and may continue to display the same image 350 as the image 110 that is currently being reproduced on the external device 100 in the remaining area of the screen.

As described above, if one of the search menu 341 and the storage menu 342 included in the task execution menu 340 is selected by the user in a state where the thumbnail image 330 and the task execution menu 340 are displayed on the one area of the screen, the controller 240 may perform the operation corresponding to the selected menu.

According to an embodiment, if the search menu 341 is selected by the user, the controller 240 controls the display 220 to display the search screen related to the selected search menu 341. Specifically, if the search menu 341 for the search window object 310 is selected, the controller 240 requests a search for a keyword that is included in the search window object through accessing the web server 300 related to the search window object through the communicator 210. Thereafter, if the search result according to the search request is received from the web server 300, the display 220 may display the search screen 341 for the received search result. Accordingly, referring to FIG. 4B, the search screen 360 for the keyword included in the search window object 310 may be displayed on the screen of the portable terminal device 200. Accordingly, the user can be provided with the scene on which the element of interest occurs in the image 350 that is currently viewed or the search result for the keyword through the search screen 360 that is displayed on the screen.

On the other hand, if the storage menu 342 for storing the captured image 320 is selected, the controller 240 controls the storage 250 to store the captured image 320 that is displayed as the thumbnail image 330. According to the control command, the storage 250 stores the captured image 320 that is displayed on the screen. Accordingly, referring to FIG. 4C, the captured image 320 may be stored in the storage 320 together with other captured images. However, the present disclosure is not limited thereto, and the storage menu 342 for storing the captured image 320 need not be separately provided. In this case, as described above with reference to FIGS. 3A to 3C, the controller 240 can store the captured image 320 generated at the time when the selection command is input from the user in the storage 250 without any separate operation command.

As described above, as the captured image 320 is stored in the storage 250, the user can solve the inconvenience which is caused by forgetting of the element of interest occurring during viewing the element image that occurs in the image 300 that is currently viewed or searching for information on the corresponding concerned element with interception of viewing of the image 300 that is currently being reproduced.

According to another embodiment, an object related to a phone number may be included in the captured image 320 that is generated at the time when the selection command is input. As described above, if the object related to the phone number is included in the captured image 320, the controller 240 controls the display 220 to display a call connection menu corresponding to the phone number. Accordingly, the display 220 displays the task execution menu that includes the captured image 320 and the call connection menu corresponding to the phone number on the one area of the screen. Thereafter, if a phone call menu that is included in the task execution menu is selected by the user, the controller 240 attempts the call connection using the corresponding phone number. Accordingly, the user can solve the inconvenience that is caused by attempting the call connection through direct pressing of the button corresponding to the phone number displayed on the screen. This embodiment thus relieves the user of the troubles of needing to remember, record, and manually enter the displayed telephone number.

For example, the portable terminal device 200 may display the same image, for example, a home shopping picture, as that displayed on the external device 100. Accordingly, the user can view the home shopping picture through at least one of the external device 100 and the portable terminal device 200. If a phone number for an automated order for ordering a home shopping product appears on the screen while viewing the home shopping picture, the user may press a menu button (not illustrated) or touch the screen on which the home shopping picture is displayed. If such a selection command is input, the controller 240 determines that the input selection command is a selection command related to capturing, and generates a captured image 320 of the home shopping picture at the time when the selection command is input by the user with a reduced picture size. Also, the controller 240 detects the phone number for the automated order of the home shopping product from the captured image 320 through the object recognition algorithm, and generates a task execution menu that includes a call connection menu corresponding to the detected phone number for the automated order and the storage menu 342 for storing the captured image 320. Thereafter, in accordance with the control command of the controller 220, the display 220 displays the thumbnail image 330 of the captured image 320 with a reduced size and the task execution menu on the one area of the screen and displays the same image 350 as the image 110 that is currently be reproduced on the external device 100 on the remaining area of the screen.

As described above, if the call connection menu, which is included in the task execution menu together with the storage menu 342, is selected by the user, the controller 240 attempts an automated call connection using the phone number included in the captured image 320. Accordingly, the user can order the home shopping product without manually attempting the call connection by directly pressing the buttons corresponding to the phone number for the automated order that is displayed on the screen.

According to still another embodiment, an object related to a character image or a text may be included in the captured image 320 that is generated at the time when the selection command is input. If the object related to the image or the text is included in the captured image 320, the controller 240 controls the display 220 to display a search menu for the image or the text. Accordingly, the display 220 displays the task execution menu 340 that includes the captured image and the search menu 341 for the image or the text on one area of the screen. Thereafter, if the search menu 341 for the image or the text that is included in the task execution menu 340 displayed on the screen is selected by the user, the controller 240 performs a search for the image or the text and controls the display 220 to display the result of the search. Accordingly, the display 220 can display the search result for the image or the text.

For example, the portable terminal device 200 can display a same drama as that displayed on the external device 100. Accordingly, the user can view the drama through at least one of the external device 100 and the portable terminal device 200. During the viewing of the drama, the user may be interested in learning about a character that appears in the drama. If such an element of interest occurs, the user may press a menu button (not illustrated) or touch the screen on which the drama is displayed. If such a selection command is input, the controller 240 generates a captured image 320 of the drama at the time when the selection command is input, and reduces the size of the captured image 320. Also, the controller 240 may detect at least one object related to a character that is included in the captured image 320 through the object recognition algorithm related to face recognition. If the object related to the character is detected, the controller 240 generates the task execution menu 340 that includes the search menu 341 corresponding to the detected object related to the character and the storage menu 342 for storing the captured image 320. Thereafter, in accordance with the control command of the controller 240, the display 220 displays the thumbnail image 330 of the captured image 320 with a reduced size and the task execution menu 340 on the one area of the screen and displays the same image 350 as the image 110 that is currently be reproduced on the external device 100 on the remaining area of the screen.

If the search menu 341 that is included in the task execution menu 340 is selected by the user in a state where the thumbnail image 330 and the task execution menu 340 are displayed on the one area of the screen, the controller 240 requests a search for the character corresponding to the search menu 341 through accessing the predetermined web server 300. Thereafter, if the search result according to the character search is received from the web server 300, the display 220 may display the search screen 360 for the received search result. Accordingly, the user can be provided with the search result for the character appearing in the drama that is currently viewed through the search screen 360 that is displayed on the screen.

According to another example, the portable terminal device 200 can display the same news as that displayed on the external device 100. Accordingly, the user can view the news through at least one of the external device 100 and the portable terminal device 200. During the viewing of the news, the user may be interested in learning about a caption that appears in the news. If such an element of interest occurs, the user may press a menu button (not illustrated) or touch the screen on which the news is displayed. If such a selection command is input, the controller 240 generates a captured image 320 of the news at the time when the selection command is input, and reduces the size of the captured image 320. Also, the controller 240 may detect at least one object related to a text that is included in the captured image through the object recognition algorithm related to text pattern recognition. If the object related to the text is detected, the controller 240 generates the task execution menu 340 that includes the search menu 341 corresponding to the detected object related to the text and the storage menu 342 for storing the captured image 320. Thereafter, in accordance with the control command of the controller 240, the display 220 displays the thumbnail image 330 of the captured image 320 with a reduced size and the task execution menu 340 on the one area of the screen and displays the same image 350 as the image 110 that is currently be reproduced on the external device 100 on the remaining area of the screen.

If the search menu 341 that is included in the task execution menu 340 is selected by the user in a state where the thumbnail image 330 and the task execution menu 340 are displayed on the one area of the screen, the controller 240 requests a search for the related news of the caption corresponding to the search menu 341 through accessing the predetermined web server 300. Thereafter, if the search result for the related news is received from the web server 300, the display 220 may display the search screen 360 for the received search result. Accordingly, the user can be provided with the related news of the news caption that is currently viewed through the search screen 360 that is displayed on the screen.

On the other hand, if the selection command input through the inputter 230 is a command for a specific object that is included in the image 300, the controller 240 detects the object that is displayed on the area designated by the selection command in the image 300, and performs the operation corresponding to the detected object. Specifically, the user may be interested in learning more about an object such as a character or a text included in the image 300 while viewing the image 300 through at least one of the external device 100 and the portable terminal device 200. In this case, the user can select at least one object which the user is interested in learning more about from the image 300 that is displayed on the screen. If such a selection command is input, the controller 240 may detect a coordinate value of the area designated by the selection command input by the user and the object that is displayed on the corresponding area through the object recognition algorithm.

According to an embodiment, if the detected object is the search window object 310, the controller 240 may control the display 220 to display the search screen 360 corresponding to the search window object 310. Accordingly, the display 220 may display the search screen 360 corresponding to the detected search window object 310. According to another embodiment, if the detected object is the phone number, the controller 240 may attempt the call connection using the detected phone number. Accordingly, the user can solve the inconvenience that is caused by manually attempting the call connection, through direct pressing of the button corresponding to the phone number displayed on the screen. According to still another embodiment, if the detected object is the image or the text, the controller 240 may perform the search for the detected image or text and may control the display 220 to display the search result 360. Accordingly, the display 220 may display the search screen corresponding to the object related to the detected image or text.

Hereinafter, the above-described embodiment will be described in more detail.

First, a case where the detected object is the search window object 310 will be described. For example, as described above with reference to FIGS. 3A to 3C, the portable terminal device 200 may display the same image 300, for example, an advertisement, as that displayed on the external device 100. The advertisement image 300 may include the search window object 310 including a keyword for the corresponding advertisement, and the user may be interested in learning more about the keyword included in the corresponding advertisement image 300 and may select the search window object 310 that is displayed on the screen.

If the selection command is input, the controller 240 may detect the search window object 310 displayed on the corresponding area through the coordinate value of the area that is designated by the selection command and the object recognition algorithm. If the search window object 310 is detected, the controller 240 requests the search for the keyword that is included in the search window object 310 through accessing the web server 300 related to the search window object 310 through the communicator 210. Thereafter, if the search result according to the search request is received from the web server 300, the display 220 displays the search screen 360 for the received search result on the whole screen as shown in FIG. 4B. However, the present disclosure is not limited thereto. The display 220 may display the search screen 360 for the received search result on one area of the screen, and may display the same image 350 as the image 110 that is displayed on the external device 100 on the remaining area of the screen. Accordingly, the user can be provided with the scene on which the element of interest occurs in the image 300 that is currently being viewed or the search result for the keyword through the search screen 360 that is displayed on the screen.

Hereinafter, a case where the detected object is the object related to the phone number will be described.

Figure 5:
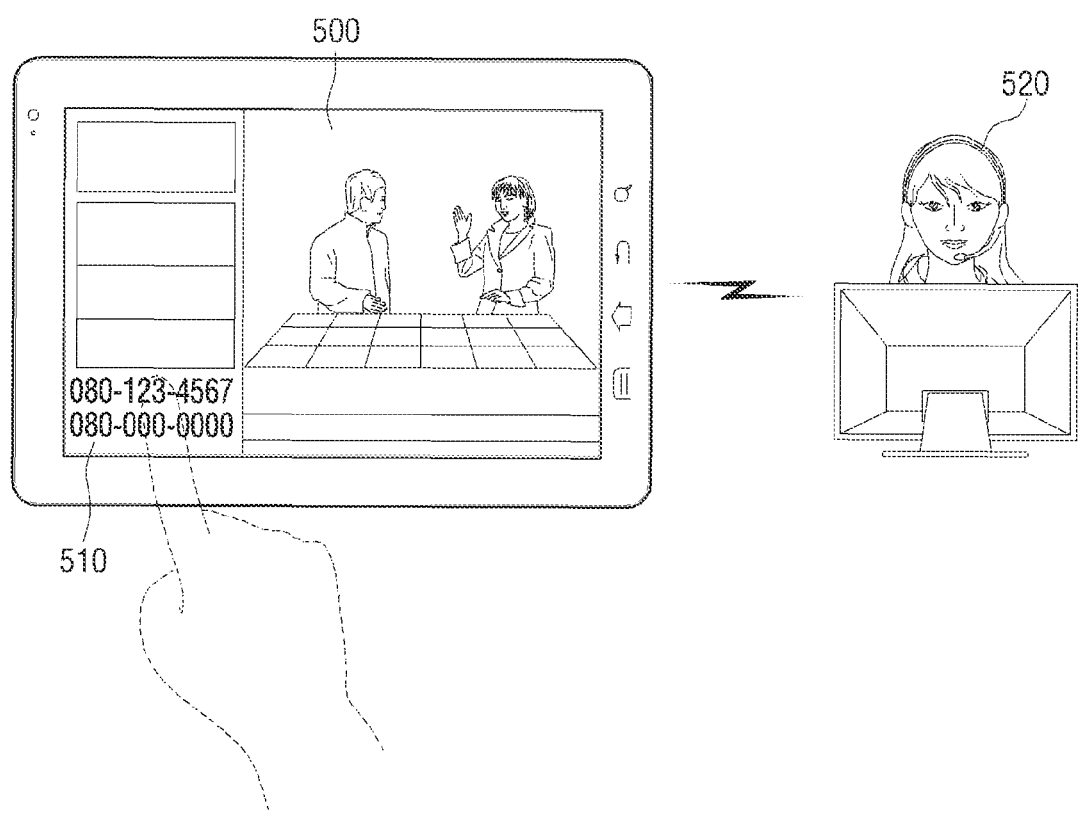
FIG. 5 is an view explaining performing of an operation corresponding to an object related to a phone number in a portable terminal device according to an embodiment of the present disclosure.

FIG. 5 is a view explaining performing of an operation corresponding to an object related to a phone number in a portable terminal device according to an embodiment of the present disclosure.

Referring to FIG. 5, the portable terminal device 200 may display the same image 500, for example, a home shopping picture, as that displayed on the external device 100. Accordingly, the user can view the home shopping picture 500 through at least one of the external device 100 and the portable terminal device 200. If a phone number 510 for an automated order for ordering a home shopping product appears on the screen while viewing the home shopping picture 500, the user may select the area where the phone number 510 for the automated order is displayed. If such a selection command is input, the controller 240 may detect the phone number 510 for the automated order that is displayed on the screen through the coordinate value of the area that is designated by the input selection command and the object recognition algorithm. If the phone number 510 for the automated order is detected, the controller 240 attempts an automated call connection to the corresponding home shopping merchant using the detected phone number 510 for the automated order. Accordingly, the user can order the home shopping product through calling with the staff 520 of the home shopping merchant without manually attempting the call connection, by directly pressing the buttons corresponding to the phone number 510 for the automated order that is displayed on the screen.

Hereinafter, a case where the detected object is the image or text object will be described.

Figure 6A:
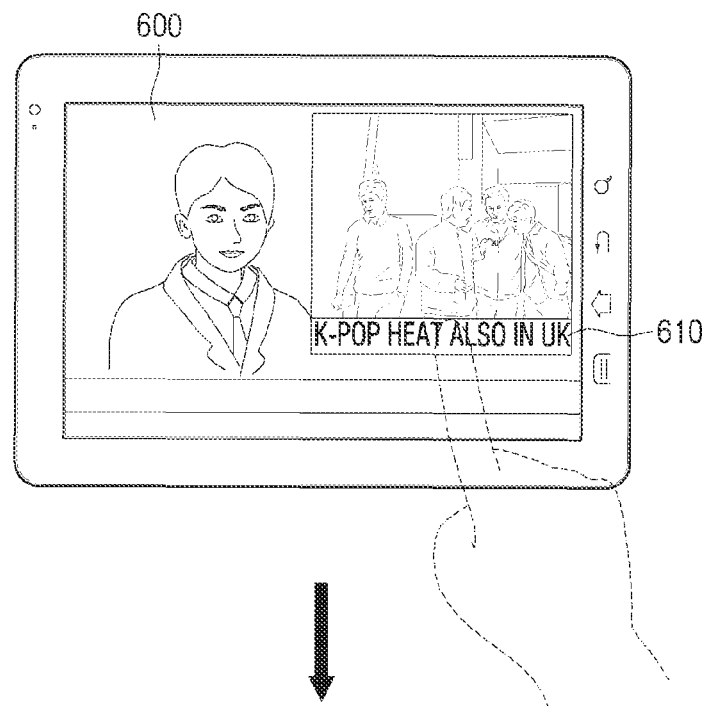
FIGS. 6A and 6B are first views explaining performing of an operation corresponding to an image or a text object in a portable terminal device according to an embodiment of the present disclosure.
Figure 6B:
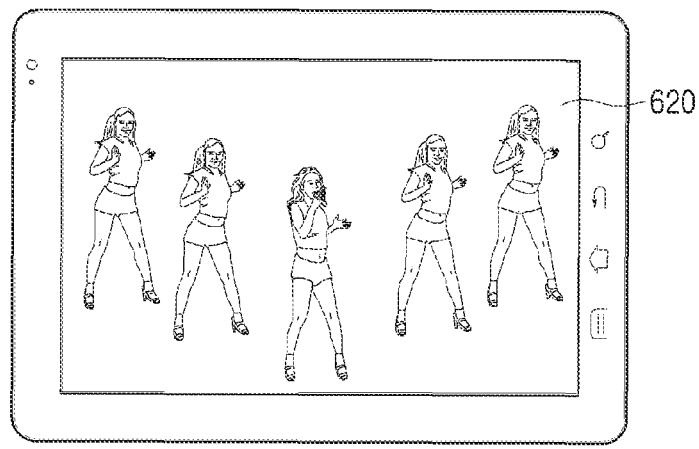

FIGS. 6A and 6B are views explaining the performing of an operation corresponding to an image or a text object in a portable terminal device according to an embodiment of the present disclosure.

Referring to FIG. 6A, the portable terminal device 200 can display the same image 600, for example, news, as that displayed on the external device 100. Accordingly, the user can view the news image 600 through at least one of the external device 100 and the portable terminal device 200. During the viewing of the news image 600, the user may be interested in learning more about a caption 610 that appears in the news image 600. If such an element of interest occurs, the user may select the area where the caption 610 is displayed. If such a selection command is input, the controller 240 may detect the caption 610 that is displayed on the corresponding area through the coordinate value of the area that is designated by the selection command and the object recognition algorithm. If the caption 610 is detected, the controller 240 requests a search for the related news of the corresponding caption 610 through accessing the predetermined web server 300. Thereafter, if the search result for the related news is received from the web server 300, the display 220 may display the search result 620 for the related news as shown in FIG. 6B. Accordingly, the user can be provided with the related news of the news caption 610 that is currently viewed through the search result 620 that is displayed on the screen.

Figure 7A:
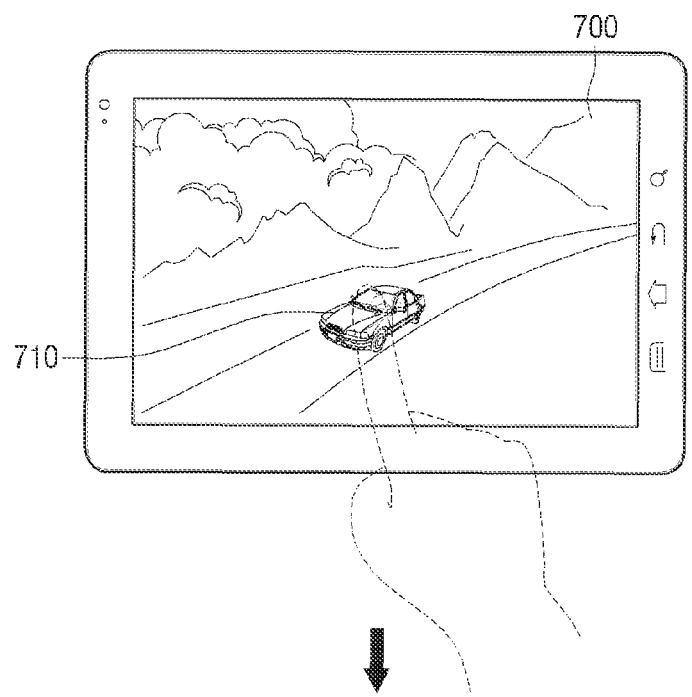
FIGS. 7A and 7B are second views explaining performing of an operation corresponding to an image or a text object in a portable terminal device according to another embodiment of the present disclosure.
Figure 7B:
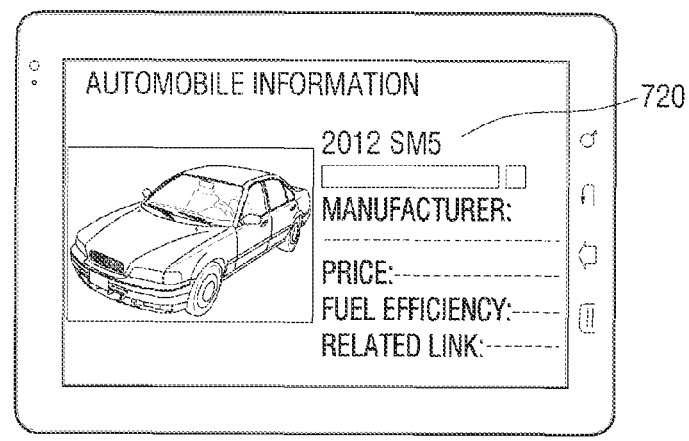

FIGS. 7A and 7B are second views explaining the performing of an operation corresponding to an image or a text object in a portable terminal device according to another embodiment of the present disclosure.

Referring to FIG. 7A, the portable terminal device 200 can display the same image 700, for example, an automobile advertisement image, as that displayed on the external device 100. Accordingly, the user can view the automobile advertisement image 700 through at least one of the external device 100 and the portable terminal device 200. During the viewing of the automobile advertisement image 700, the user may be interested in learning more about an automobile 710 that appears in the advertisement image 700. If such an element of interest occurs, the user may select the area where the automobile 710 is displayed. If such a selection command is input, the controller 240 may detect the automobile 710 that is displayed on the corresponding area through the coordinate value of the area that is designated by the selection command and the object recognition algorithm. If the automobile 710 is detected, the controller 240 requests automobile information of the corresponding automobile 710 through accessing the predetermined web server 300. Thereafter, if the automobile information is received from the web server 300, the display 220 may display the automobile information 720 that is received from the web server 300 on the screen as shown in FIG. 7B. Accordingly, the user can be provided with information, such as the price and fuel efficiency of the automobile, of the automobile 710 appearing in the advertisement image 700 through the automobile information 720 that is displayed on the screen.

Figure 8A:
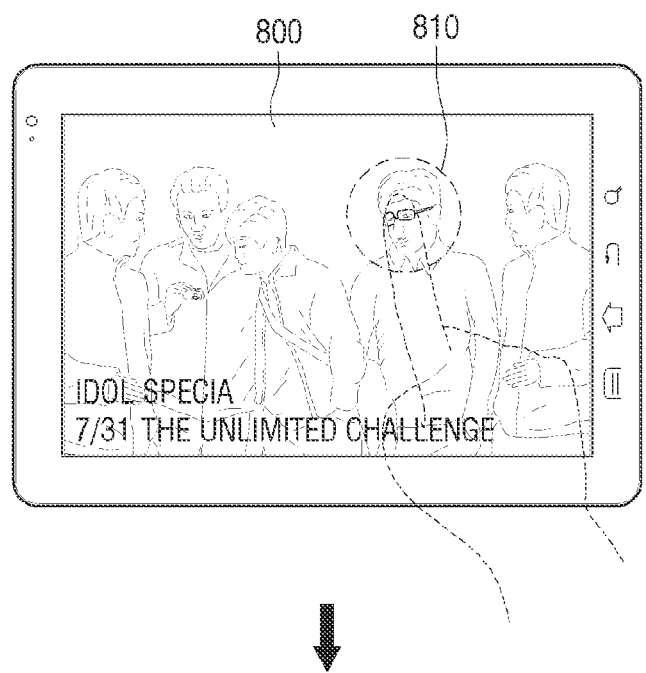
FIGS. 8A and 8B are third views explaining performing of an operation corresponding to an image or text object in a portable terminal device according to still another embodiment of the present disclosure.
Figure 8B:
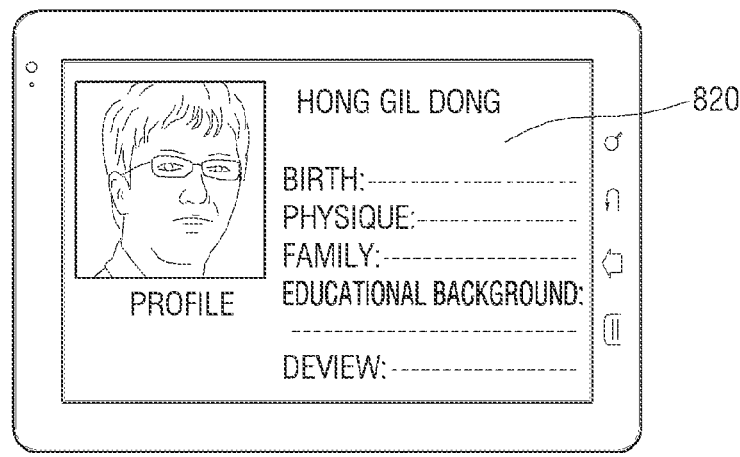

FIGS. 8A and 8B are third views explaining the performing of an operation corresponding to an image or text object in a portable terminal device according to still another embodiment of the present disclosure.

Referring to FIG. 8A, the portable terminal device 200 can display the same image 800, for example, an entertainment broadcasting program, as that displayed on the external device 100. Accordingly, the user can view the entertainment broadcasting program 800 through at least one of the external device 100 and the portable terminal device 200. During viewing the entertainment broadcasting program 800, the user may be interested in learning more about a character 810 that is one of characters appearing in the entertainment broadcasting program 800. If such an element of interest occurs on the character 810, the user may select the area where the character 810, whom the user is interested in learning more about, is displayed. If such a selection command is input, the controller 240 may detect the character 810 that is displayed on the corresponding area through the coordinate value of the area that is designated by the selection command and the object recognition algorithm. If the character 810 is detected, the controller 240 requests a search result for the character 810 through accessing the predetermined web server 300. Thereafter, if the search result for the character 810 is received from the web server 300, the display 220 may display the search result 820 that is received from the web server 300 on the screen as shown in FIG. 8B. Accordingly, the user can be provided with information, such as a birth date, physique, family, and educational background, on the character 810 through the search result 820 displayed on the screen.

On the other hand, if a selection command is input from the user, the controller may control the operation of the external device 100 in accordance with the input selection command.

Figure 9:
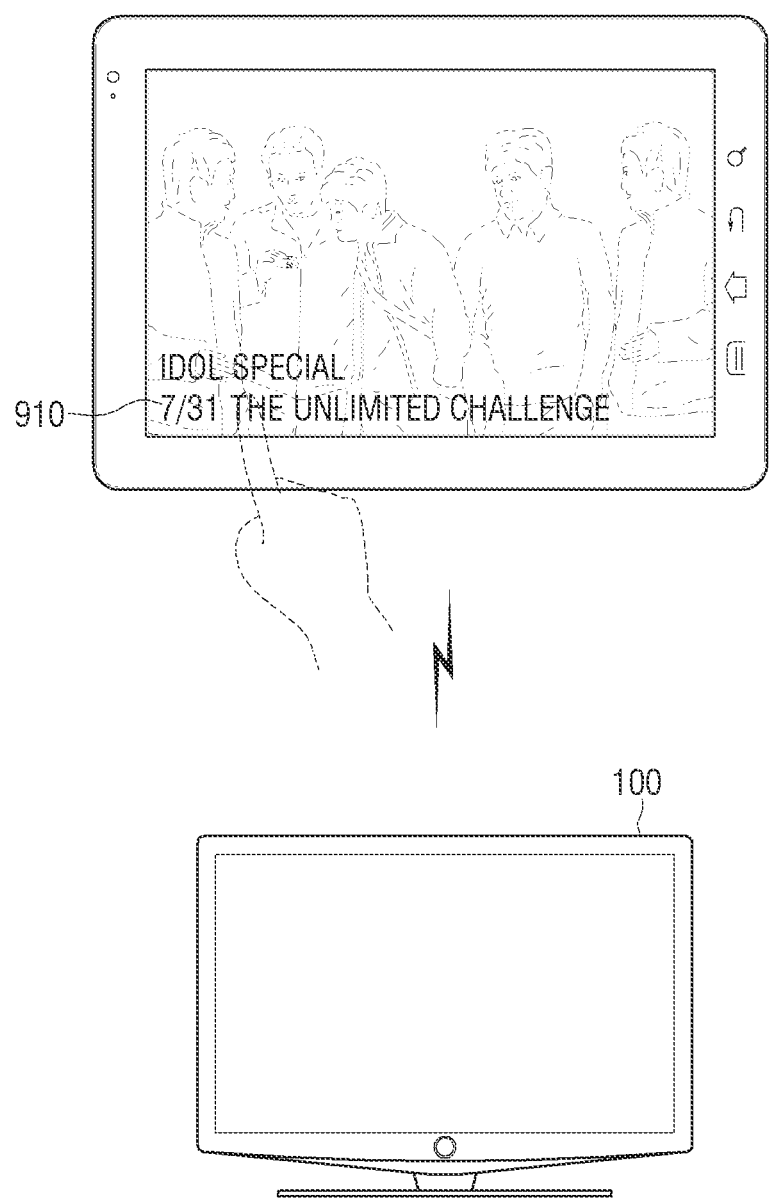
FIG. 9 is a view explaining control of an operation of an external device according to a user's selection command in a portable terminal device according to an embodiment of the present disclosure.

FIG. 9 is a view explaining the control of an operation of an external device according to a user's selection command in a portable terminal device according to an embodiment of the present disclosure.

Referring to FIG. 9, the portable terminal device 200 may display an image 910, for example, a broadcasting preview image, of the same entertainment broadcasting program as that displayed on the external device 100. Accordingly, if the broadcasting preview image 910 of the entertainment broadcasting program is displayed through at least one of the external device 100 and the portable terminal device 200, the user may request that automatic reserved recording or automatic channel changing is performed at a time when the entertainment broadcasting program of the displayed broadcasting preview image 910 starts. According to an embodiment, if the broadcasting preview image 910 of the entertainment broadcasting program is displayed on the screen, the user selects the broadcasting preview image 910 that is displayed on the screen. Thereafter, the user may request the automatic reserved recording or the automatic channel changing with respect to the entertainment broadcasting program of the selected broadcasting preview image 910.

If such a user command is input, the controller 240 receives additional data, such as Electronic Program Guide (EPG) information, from the external device 100. In addition, the controller 240 recognizes which program is the entertainment broadcasting program of the broadcasting preview image 910 at the time when the selection command is input from the user through the object recognition algorithm. For example, a title of an entertainment broadcasting program may be included in the broadcasting preview image 910 at the time when the selection command is input from the user. Accordingly, the controller 240 may recognize the entertainment broadcasting program of the broadcasting preview image 910 through the object recognition algorithm. As described above, if the entertainment broadcasting program of the broadcasting preview image 910 is recognized, the controller 240 may transmit a control command related to the automatic reserved recording or automatic channel changing of the corresponding entertainment broadcasting program to the external device 100 based on the additional data received from the external device 100.

Accordingly, in accordance with the control command received from the portable terminal device 200, the external device 100 may perform recording or channel changing to a channel that provides the corresponding entertainment broadcasting program at the time when the corresponding entertainment broadcasting program starts.

According to the additional aspect of the present disclosure, the controller 240 can automatically delete the captured image 320 that is stored for a period that exceeds the predetermined threshold period with reference to the storage history information of the captured images stored in the storage 250. For example, the captured image 320 may be stored in the storage 250 only for one week on the basis of the date when the captured image 320 is stored in the storage 250. As such a threshold period is set, the controller 240 operates to automatically delete the captured image 320 that is stored after one week on the basis of the date when the captured image 320 is stored in the storage 250. As described above, if the time period in which the captured image 320 is stored in the storage 250 exceeds the predetermined threshold period, the corresponding captured image 320 is automatically deleted from the storage 250, and thus it is possible to prevent excessive captured images from being continuously stored in the storage 250.

The respective configurations of the portable terminal device 200 according to an embodiment of the present disclosure have been described in detail. Hereinafter, a method for performing an operation corresponding to the user's selection command in the portable terminal device 200 according to an embodiment of the present disclosure will be described in detail.

Figure 10:
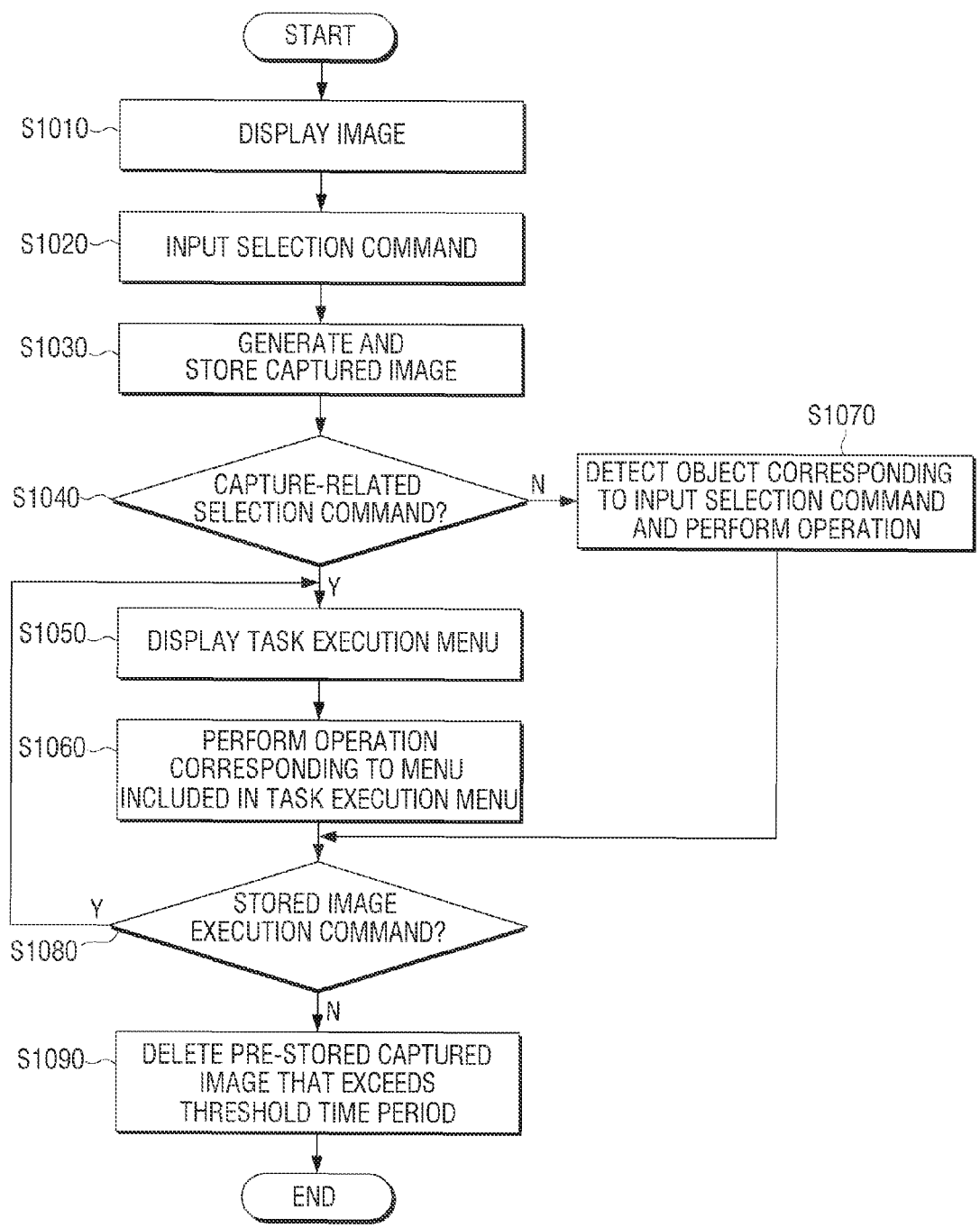
FIG. 10 is a flowchart of a method for performing an operation corresponding to a user's selection command in a portable terminal device according to an embodiment of the present disclosure.

FIG. 10 is a flowchart of a method for performing an operation corresponding to a user's selection command in a portable terminal device according to an embodiment of the present disclosure.

Referring to FIG. 10, the portable terminal device 200, which interlocks with the external device 100, displays the same image 201 as the image 110 that is currently displayed on the external device 100 at operation S1010. If the selection command is input from the user at operation S1020, the portable terminal device 200, which displays the same image 201 as the image 110 that is displayed on the external device 100, generates and stores the captured image 202 of the image 201 at the time when the selection command is input at operation S1030. However, the present disclosure is not limited thereto. If the storage command for the captured image 202 is input from the user at operation S1020, the portable terminal device 200 may store the corresponding captured image 202. In the present disclosure, if the selection command is input from the user at operation S1020, the captured image 202 of the image 201 at the time when the selection command is input is generated and stored, which will be described.

If the captured image 202 of the image 201 at the time when the selection command is input is generated and the generated captured image is stored, in accordance with the user's selection command at operation S1020, the portable terminal device 200 performs the operation corresponding to the object included in the image 201 at the time when the selection command is input at operation S1020. Specifically, the portable terminal device 200 checks whether the selection command that is input by the user through the operation S1020 is a selection command related to capturing or a command related to the selection of a specific object included in the image 201 at operation S1040. If the command is determined to be the selection command related to capturing as the result of checking, the portable terminal device 200 displays at operation S1050 a task execution menu that includes a menu corresponding to at least one object included in the captured image 202 on one area of the screen, and if one of the menus included in the task execution menu that is displayed on one area in operation S1050 is selected, the portable terminal device 200 performs the operation corresponding to the selected menu at operation S1060.

According to an embodiment, the search window object may be included in the captured image 202 that is generated at the time when the selection command is input at operation S1020. As described above, if the search window object is included in the captured image 202, the portable terminal device 200 generates the task execution menu that includes the search menu corresponding to the search window object on one area of the screen. Also, the portable terminal device 200 reduces the size of the captured image 202 so that the captured image 202 that is generated at the time when the selection command is input at operation S1020 is displayed on one area. Thereafter, the portable terminal device 200 displays the task execution menu that includes the thumbnail image of the captured image 202 with a reduced size and the search menu corresponding to the search window object that is included in the corresponding captured image 202 on one area of the screen.

Thereafter, if the search menu that is included in the task execution menu is selected by the user, the portable terminal device 200 displays the search screen related to the selected search menu. Specifically, if the search menu corresponding to the search window object is selected, the portable terminal device 200 requests the search for the keyword that is included in the search window object through accessing the web server 300 related to the search window object. Thereafter, if the search result according to the search request is received from the web server 300, the portable terminal device 200 may display the search screen for the received search result. Accordingly, as shown in FIGS. 4A to 4C, the user can be provided with the scene on which the element of interest occurs in the image 300 that is currently viewed or the search result 360 for the keyword through the search screen 341 that is displayed on the screen.

According to another embodiment, the search window object 310 may be included in the captured image 320 that is generated at the time when the selection command is input. As described above, if the search window object 310 is included in the captured image 320, the portable terminal device 200 may display the task execution menu 340 that includes the thumbnail image 330 of the captured image 320 and the call connection menu corresponding to the phone number on one area of the screen, and may display the same image 350 as the image 110 that is currently being reproduced in the external device 100 in the remaining area.

For example, the portable terminal device 200 may display the same home shopping picture 500 as the image 110 displayed on the external device 100. Accordingly, the user can view the home shopping picture 500 through at least one of the external device 100 and the portable terminal device 200. If a phone number 510 for an automated order for ordering a home shopping product appears on the screen while viewing the home shopping picture 500, the user may press the menu button (not illustrated) or touch the screen on which the home shopping picture 500 is displayed. If such a selection command is input, the controller 240 determines that the input selection command is the selection command related to capturing, and generates the captured image 202 of the home shopping picture 500 at the time when the selection command is input by the user with a reduced picture size. Also, the portable terminal device 200 detects the phone number 510 for the automated order for ordering the home shopping product from the captured image 202 through the object recognition algorithm, and generates the task execution menu that includes the call connection menu corresponding to the detected phone number for the automated order. Thereafter, the portable terminal device 200 displays the thumbnail image of the captured image 202 with a reduced size and the call connection menu on the one area of the screen and displays the same image 350 as the image 110 that is currently be reproduced on the external device 100 on the remaining area of the screen.

As described above, if the call connection menu, which is included in the task execution menu, is selected by the user in a state where the thumbnail image and the task execution menu 340 are displayed on the one area of the screen, the portable terminal device 200 attempts the automated call connection using the phone number 510 included in the captured image 320. Accordingly, the user can order the home shopping product without manually attempting the call connection by directly pressing the buttons corresponding to the phone number 510 for the automated order that is displayed on the screen.

According to still another embodiment, the object related to the character image or the text may be included in the captured image 320 that is generated at the time when the selection command is input at operation S1020. If the object related to the image or the text is included in the captured image 320, the portable terminal device 200 displays the task execution menu 340 that includes the captured image 320 and the search menu for the image or the text on one area of the screen. Thereafter, if the search menu for the image or the text that is included in the task execution menu 340 displayed on the screen is selected by the user, the portable terminal device 200 performs the search for the image or the text and controls the display 220 to display the result 360 of the search.

For example, the portable terminal device 200 may display the same drama 800 as that displayed on the external device 100. Accordingly, the user can view the drama 800 through at least one of the external device 100 and the portable terminal device 200. During the viewing of the drama 800, the user may be interested in learning more about a character 810 that appears in the drama 800. If such an element of interest occurs, the user may press a menu button (not illustrated) or touch the screen on which drama 800 is displayed. If such a selection command is input, the portable terminal device 200 generates the captured image 320 of the drama 800 at the time when the selection command is input at operation S1020, and reduces the size of the captured image 320. Also, the portable terminal device 200 may detect at least one object related to a character 810 that is included in the captured image 320 through the object recognition algorithm related to face recognition. If the object related to the character 810 is detected, the portable terminal device 200 generates the task execution menu 340 that includes the search menu 341 corresponding to the detected object related to the character 810. Thereafter, the portable terminal device 200 displays the thumbnail image 330 of the captured image 320 with a reduced size and the task execution menu 340 on the one area of the screen and displays the same image 350 as the image 110 that is currently be reproduced on the external device 100 on the remaining area of the screen.

If the search menu 340 is selected by the user in a state where the task execution menu 340 that includes the thumbnail image 330, the search menu 341, and the storage menu 342 is displayed on the one area of the screen, the portable terminal device 200 requests the search for the character 810 corresponding to the search menu 341 through accessing the predetermined web server 300. Thereafter, if the search result according to the character 810 search is received from the web server 300, the portable terminal device 200 may display the search screen 360 for the received search result. Accordingly, the user can be provided with the search result for the character 810 appearing in the drama 800 that is currently viewed through the search screen 360 that is displayed on the screen.

On the other hand, if the selection command that is input by the user in operation S1046 is a command for the specific object that is included in the image 201, the portable terminal device 200 detects the object displayed in the area that is designated according to the selection command in the image 201, and performs the operation corresponding to the detected object at operation S1070.

According to an embodiment, if the detected object is the search window object 310, the portable terminal device 200 may display the search screen 360 corresponding to the search window object. For example, the portable terminal device 200 may display the same advertisement image 300 as that displayed on the external device 100. The advertisement image 300 may include the search window object 310 including the keyword for the corresponding advertisement, and the user may be interested in learning more about the keyword included in the corresponding advertisement image and may select the search window object 310 that is displayed on the screen.

If the selection command is input at operation S1020, the portable terminal device 200 may detect the search window object 310 displayed on the corresponding area through the coordinate value of the area that is designated by the selection command and the object recognition algorithm. If the search window object 310 is detected, the portable terminal device 200 requests the search for the keyword that is included in the search window object 310 through accessing the web server 300 related to the search window object 310. Thereafter, if the search result according to the search request is received from the web server 300, the portable display device 200 displays the search screen 360 received from the web server 300 on the whole screen. However, the present disclosure is not limited thereto. The portable display device 200 may display the search screen 360 for the received search result on one area of the screen, and may display the same image 350 as the image 110 that is displayed on the external device 100 on the remaining area. Accordingly, the user can be provided with the scene on which the element of interest occurs in the image 300 that is currently being viewed or the search result for the keyword through the search screen 360 that is displayed on the screen.

According to another embodiment, if the detected object is the object related to the phone number 510, the portable terminal device 200 may automatically attempt the call connection using the detected phone number 510.

For example, as described above with reference to FIG. 5, the portable terminal device 200 may display the same home shopping picture 500 as the image 110 displayed on the external device 100. Accordingly, the user can view the home shopping picture 500 through at least one of the external device 100 and the portable terminal device 200. If a phone number 510 for an automated order for ordering a home shopping product appears on the screen while viewing the home shopping picture 500, the user may select the area where the phone number 510 for the automated order is displayed. If such a selection command is input at operation S1020, the portable terminal device 200 may detect the phone number 510 for the automated order that is displayed on the screen through the coordinate value of the area that is designated by the input selection command and the object recognition algorithm. If the phone number 510 for the automated order is detected, the portable terminal device 200 attempts an automated call connection to the corresponding home shopping merchant using the detected phone number 510 for the automated order. Accordingly, the user can order the home shopping product through calling with the staff 520 of the home shopping merchant without manually attempting the call connection by directly pressing the buttons corresponding to the phone number 510 for the automated order that is displayed on the screen.

According to still another embodiment, if the detected object is the image or the text 610, the portable terminal device 240 may perform the search for the detected image or text 610 and may control the display 220 to display the search result. Accordingly, the display 220 can display the search screen 620 corresponding to the detected object related to the image or the text 610.

For example, as described above with reference to FIGS. 6A and 6B, the portable terminal device 200 can display the same news as the image 110 displayed on the external device 100. Accordingly, the user can view the news through at least one of the external device 100 and the portable terminal device 200. During the viewing of the news, the user may be interested in learning more about a caption 610 that appears in the news. If such an element of interest occurs, the user may select the area where the caption 610 is displayed. If such a selection command is input at operation S1020, the portable terminal device 200 may detect the caption 610 that is displayed on the corresponding area through the coordinate value of the area that is designated by the selection command and the object recognition algorithm. If the caption 610 is detected, the portable terminal device 200 requests the search for the related news of the corresponding caption 610 through accessing the predetermined web server 300. Thereafter, if the search result for the related news is received from the web server 300, the portable terminal device 200 may display the received search result 620 for the related news. Accordingly, the user can be provided with the related news of the news caption 610 that is currently viewed through the search result 620 that is displayed on the screen.

According to still another embodiment, the portable terminal device 200 can display the same automobile advertisement image 700 as the image 110 displayed on the external device 100. Accordingly, during the viewing of automobile advertisement image 700 through at least one of the external device 100 and the portable terminal device 200, the user may be interested in learning more about an automobile 710 that appears in the advertisement image 700. If such an element of interest occurs, the user may select the area where the automobile 710 is displayed. If such a selection command is input at operation S1020, the portable terminal device 200 may detect the automobile 710 that is displayed on the corresponding area through the coordinate value of the area that is designated by the selection command and the object recognition algorithm. If the automobile 710 is detected, the portable terminal device 200 requests automobile information 720 of the corresponding automobile 710 through accessing the predetermined web server 300. Thereafter, if the automobile information 720 is received from the web server 300, the portable terminal device 200 may display the automobile information 720 that is received from the web server 300 on the screen. Accordingly, the user can be provided with information 720, such as the price and fuel efficiency, of the automobile 710 appearing in the advertisement image 700 through the automobile information 720 that is displayed on the screen.

As described above, the portable terminal device 200, which performs the operation for the object included in the image at the time when the selection command is input at operation S1020 through S1040 to S1070, checks whether the execution command for the pre-stored captured image is input at operation S1080. If it is determined at operation S1080 that the stored image execution command is input, the portable terminal device 200 displays the plurality of pre-stored captured images on the screen. Thereafter, if one of the plurality of captured images displayed on the screen is selected by the user, the portable terminal device 200 displays the thumbnail image of the selected captured image and menus corresponding to at least one object included in the corresponding captured image on the one area of the screen at operation S1050. Thereafter, if one of the menus that is displayed on the one area of the screen at operation S1050 is selected, the portable terminal device 200 may perform the operation corresponding to the menu selected through a series of processes, such as S1050 to S1060.

On the other hand, if it is checked that the stored image execution command is not input, the portable terminal device 200 automatically deletes the captured image that is stored for a period that exceeds the predetermined threshold period with reference to the storage history information of the pre-stored captured image at operation S1090. For example, the captured image may be stored for one week on the basis of the date when the captured image is stored in the storage 250. As the threshold period is set, the portable terminal device 200 automatically deletes the captured image that is stored over one week on the basis of the date when the captured image is stored in the storage 250 with reference to the storage date included in the storage history information of the plurality of pre-stored captured images. Accordingly, the portable terminal device 200 can prevent excessive captured images from being continuously stored in the storage 250.

Up to now, the method for performing the operation corresponding the user's selection command in the portable terminal device 200 that displays the same image 201 as the image 110 displayed on the external device 100 according to an embodiment of the present disclosure has been described. Hereinafter, a portable terminal device 200, which receives a picture that is displayed on the external device 100 and performs an operation according to a user's selection command for the received picture, will be described.

As described above, the portable terminal device 200 may perform an operation corresponding to an object which is included in the captured image of the picture that is displayed on the external device 100 in accordance with a user command, without displaying the same image as the image 110 displayed on the external device 100. As described above with reference to FIG. 2, the portable terminal device 200 includes the communicator 210, the display 220, the inputter 230, and the controller 240.

For communication with the external device 100, the communicator 210 receives a picture 110 that is displayed on the external device 100, and the display 220 displays the picture 201 received from the external device 100 through the communicator 210. The inputter 230 receives a selection command for a picture among pictures displayed on the external device 100 and a user command for selecting an object that is included in the picture displayed through the display 220. Further, the controller 240 controls the display 220 to display the task execution menu for the object selected according to the user command.

Specifically, if a picture of interest is displayed while viewing an image 201 through the external device 100 such as a TV, the user can select the corresponding picture of interest using an input panel, such as a touch pad or a keypad implemented in the portable terminal device 200. If the selection command is input, the communicator transmits picture request information to the external device 100 in accordance with the control command of the controller 240. The external device 100, which has received the picture request information from the portable terminal device 200, transmits the picture corresponding to the time when the picture request information among the pictures being currently displayed to the portable terminal device 200.

Accordingly, the communicator 210 receives the picture 201 corresponding to the time when the selection command is input by the user among the pictures 110 being displayed from the external device 100, and the display 220 displays the received picture 201 in accordance with the control command of the controller 240. Here, the picture 110 received from the external device 100 is the captured image 202 of the image 201 corresponding to the time when the selection command is input by the user through the inputter 230 among the pictures being displayed on the external device 100. Accordingly, if the captured image 202 is received from the external device 100, the controller 240 controls the display 220 to display the received captured image 202 on the screen. In this case, it is preferable that the controller 240 performs scaling of the captured image 202 that is received from the external device 100 to meet the display screen size and controls the display 220 to display the scaled captured image 202 on the screen. However, the present disclosure is not limited thereto. The captured image 202 that is received from the external device 100 may be scaled to meet the display screen size of the portable terminal device 200 in the external device 100.

If a user command for selecting at least one object included in the captured image 202 is input through the inputter 230 in a state where the captured image 202 is displayed on the screen, the controller 240 generates the task execution menu that includes the execution menu for the object selected by the user command and the storage menu for storing the captured image 202. Accordingly, the display 220 may display the task execution menu on one area of the screen on which the captured image 202 is displayed. However, the present disclosure is not limited thereto. If the task execution menu is generated, the display 220 may change the screen on which the captured image 202 is displayed to the task execution menu screen to display the task execution menu.

Figure 11A:
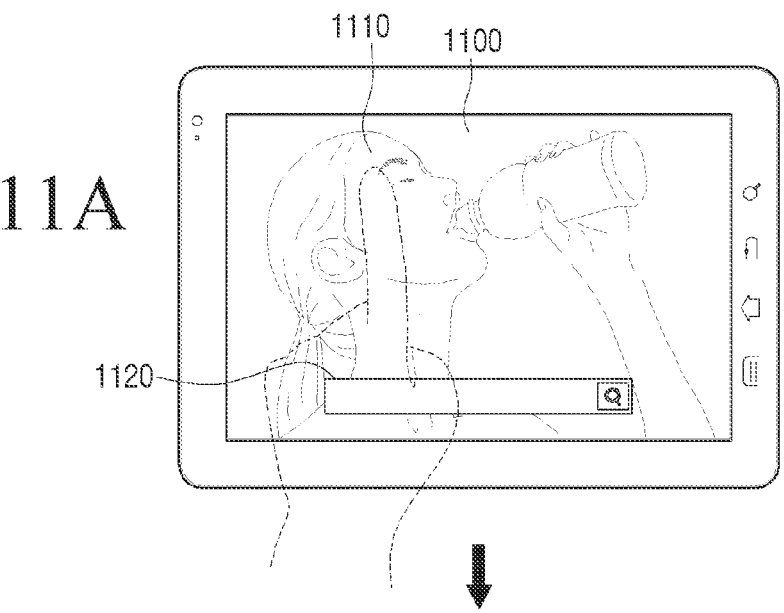
FIGS. 11A and 11B are views explaining display of a task execution menu in a portable terminal device according to an embodiment of the present disclosure.
Figure 11B:
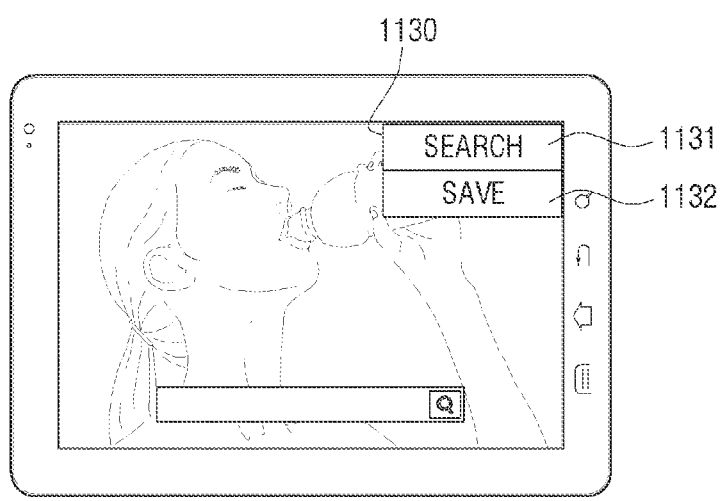

FIGS. 11A and 11B are views explaining the display of a task execution menu in a portable terminal device according to an embodiment of the present disclosure.

Referring to FIG. 11A, the portable terminal device 200 may receive and display the captured image 1100 of the picture selected according to the user's request among the pictures displayed on the external device 100. The captured image 1100 may include an object 1110 related to a character and an object 1120 related to a search. In a state where the captured image 1100 that includes the plurality of objects 1110 and 1120 is displayed, the user can select the object 1110 related to the character. If such a selection command is input, the portable terminal device 200 may detect the object corresponding to the area where the selection command is input by the user through the coordinate value of the area where the selection command is input by the user and the object recognition algorithm. If it is detected that the object corresponding to the user's selection command is the object 1110 related to the character, the portable terminal device 200 may generate a task execution menu 1130 that includes a search menu 1131 corresponding to the object 1110 related to the character and a storage menu 1132 for storing the captured image 1100 that is displayed on the screen to display the task execution menu 1130 on one area of the screen as illustrated in FIG. 11B.

However, the present disclosure is not limited thereto. If the captured image 1100 is received from the external device 100, the portable terminal device 200 may detect the objects 1110 and 1120 included in the captured image 1100 through the object recognition algorithm, and may generate the task execution menu 1130 that includes the search menu 1131 corresponding to the detected objects 1110 and 1120 and the storage menu 1132 for storing the captured image 1100 to display the task execution menu 1130 on the one area of the screen.

If a menu that is included in the task execution menu 1130 is selected in a state where the task execution menu 1130 is displayed, the portable terminal device 200 performs the operation corresponding to the selected menu. Since the operation that corresponds to the selected menu among the menus included in the task execution menu 1130, which is performed by the portable terminal device 200 according to the present disclosure, has been described in detail through FIGS. 4A to 4C, the detailed description thereof will be omitted.

The respective constituent elements of the portable terminal device 200, which receives the picture 110 that is displayed on the external device 100 and performs the operation according to the user's selection command for the received picture, have been described in detail. Hereinafter, a method for receiving a picture 110 that is displayed on the external device 100 and performing an operation according to the user's selection command for the received picture in the portable terminal device 200 will be described in detail.

Figure 12:
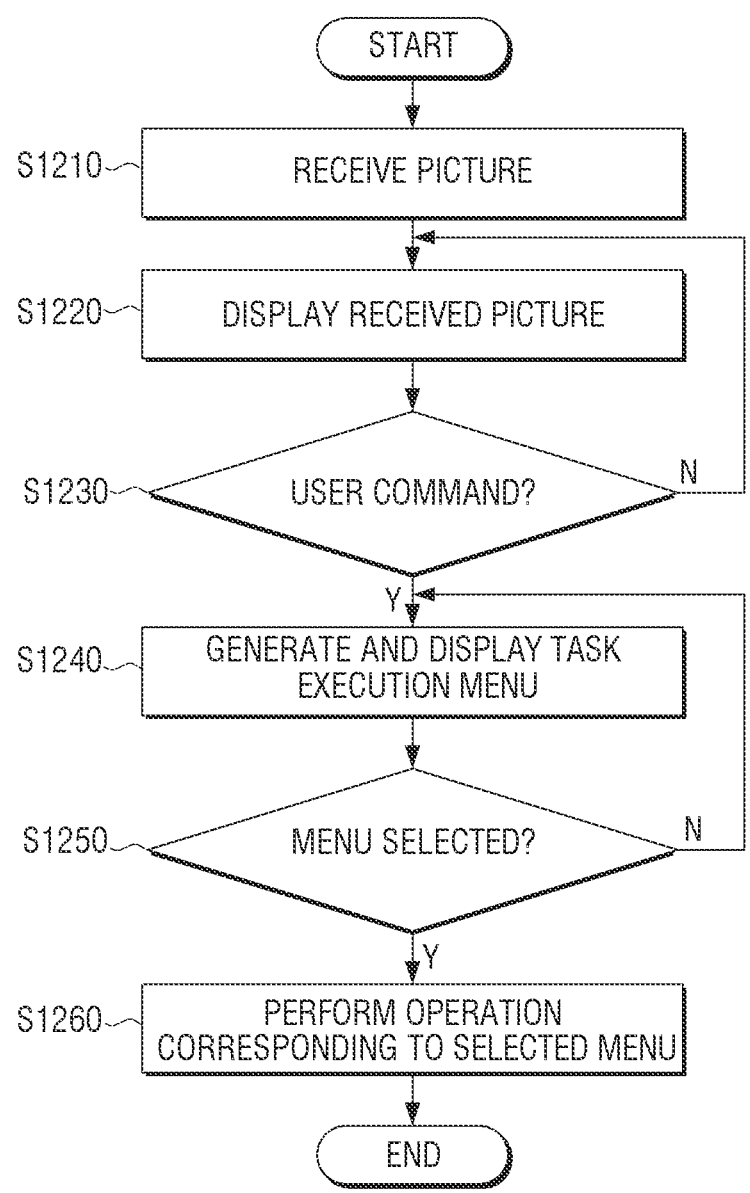
FIG. 12 is a flowchart of a method for performing an operation corresponding to a user's selection command in a portable terminal device according to another embodiment of the present disclosure.

FIG. 12 is a flowchart of a method for performing an operation corresponding to a user's selection command in a portable terminal device according to another embodiment of the present disclosure.

Referring to FIG. 12, the portable terminal device 200 at operation S1210 receives the picture 110 that is displayed on the external device 100, and displays the received picture at operation S1220. Thereafter, the portable terminal device 200 determines whether the user command for selecting the object that is included in the displayed picture is input at operation S1230. If the user command is input as the result of the determination, the portable terminal device 200 generates the task execution menu for the object that is selected by the user command, and displays the generated task execution menu on one area of the screen at operation S1240.

If the task execution menu that includes the menu for the object selected by the user command is displayed, the portable terminal device 200 determines whether at least one menu is selected among the menus included in the task execution menu that is displayed on the screen at operation S1250. If one of the menus included in the task execution menu is selected as the result of the determination, the portable terminal device 200 performs the operation corresponding to the selected menu at operation S1260.

Specifically, if a picture of interest is displayed while viewing an image through the external device 100 such as a TV, the user can select the corresponding picture using the input panel, such as the touch pad or the keypad implemented in the portable terminal device 200. If the selection command is input, the portable terminal device 200 transmits the picture request information on the selection command input by the user to the external device 100. The external device 100, which has received the picture request information from the portable terminal device 200, transmits the picture corresponding to the time when the picture request information is received, among the pictures being currently displayed, to the portable terminal device 200.

Accordingly, the portable terminal device 200 may receive the picture corresponding to the time when the selection command is input by the user, among the pictures being displayed, from the external device 100 to display the received picture. Here, the picture received from the external device 100 is the captured image of the image corresponding to the time when the selection command is input by the user among the pictures being displayed on the external device 100. Accordingly, if the captured image is received from the external device 100, the portable terminal device 200 displays the received captured image on the screen. In this case, it is preferable that the portable terminal device 200 performs scaling of the captured image that is received from the external device 100 to meet the display screen size and displays the scaled captured image on the screen. However, the present disclosure is not limited thereto. The captured image that is received from the external device 100 may be scaled to meet the display screen size of the portable terminal device 200 in the external device 100.

If the user command for selecting at least one object included in the captured image is input in a state where the captured image that is scaled to meet the picture size is displayed on the screen, at operation S1240 the portable terminal device 200 generates the task execution menu that includes the execution menu for the object selected by the user command and the storage menu for storing the captured image. Accordingly, the portable terminal device 200 may display the task execution menu on one area of the screen on which the captured image is displayed. However, the present disclosure is not limited thereto. If the task execution menu is generated, the portable terminal device 200 may change the screen on which the captured image is displayed to the task execution menu screen to display the task execution menu. As described above, if the menu that is included in the task execution menu is selected at operation S1250 in a state where the task execution menu is displayed, the portable terminal device 200 performs the operation corresponding to the selected menu at operation S1260.

On the other hand, since the operation S1240 to generate and display the task execution menu that includes the menu related to the object included in the captured image on the one area of the screen on which the captured image is displayed has been described in detail through FIG. 11, the detailed description thereof will be omitted.

Up to now, the various embodiments of the present disclosure have been described.

While the present disclosure has been shown and described with reference to various embodiments thereof, it will be understood by those skilled in the art that various changes in form and detail may be made therein without departing from the spirit and scope of the present disclosure, as defined by the appended claims and their equivalents.

What is claimed is:

1. A portable terminal device comprising:
    a display;
    a communicator configured to perform communication with an external device and receive a moving image, from the external device;
    an inputter configured to receive an input of a selection command; and
    a processor configured to:
    control the display to display the moving image received from the external device;
    capture an image of the moving image at a time when the selection command is received,
    detect an object included in the captured image,
    determine a type of the detected object, and
    control the display to:
    in response to receiving the selection command,
    display the captured image in a first area of the display,
    display a task execution menu in a second area of the display, the task execution menu comprising a first menu corresponding to the detected type of the object and a second menu for storing the captured image, and
    display the moving image in a third area of the display,
    wherein, in response to receiving a command to select a portion of the moving image, the processor is further configured to:
    recognize content in the selected portion of the moving image,
    transmit a signal requesting data related to the recognized content to the external device,
    receive the data related to the recognized content from the external device, and transmit an instruction to the external device to perform an operation on the external device based on the received data and the recognized content, and wherein the operation comprises at least one of recording content via the external device or changing a channel of the external device.

2. The portable terminal device of claim 1, further comprising a storage, wherein when the selection command is received, the processor generates a captured image of the received moving image at the time when the selection command is received and stores the captured image in the storage.

3. The portable terminal device of claim 2, wherein the display displays a task execution menu which includes the captured image and at least one menu corresponding to the object included in the captured image on one area of a screen, and wherein, when a menu included in the task execution menu is selected, the processor performs an operation corresponding to the selected menu.

4. The portable terminal device of claim 3, wherein the processor controls the display to display the task execution menu including a search menu when a search window object is included in the captured image and to display a search screen when the search menu is selected.

5. The portable terminal device of claim 3, wherein the processor displays the task execution menu including a call connection menu when a phone number is included in the captured image, and attempts a call connection using the phone number when the call connection menu is selected.

6. The portable terminal device of claim 3, wherein the processor controls the display to display the task execution menu including a search menu for an image or a text when the image or the text of the search menu is included in the captured image, and to perform a search for the image or the text of the search menu and to display a result of the search when the search menu is selected.

7. The portable terminal device of claim 3, wherein the processor performs a search for an image or a text when the detected object is the image or the text of the search, and controls the display to display the result of the search.

8. The portable terminal device of claim 2, wherein the display displays on a screen a plurality of captured images stored in the storage, according to a user command, and displays a task execution menu including the selected captured image and menus corresponding to at least one object included in the captured image on one area of the screen when one of the plurality of captured images is selected.

9. The portable terminal device of claim 2, wherein the processor automatically deletes from the storage the captured image that exceeds a predetermined threshold period with reference to storage history information of the captured images stored in the storage.

10. The portable terminal device of claim 1, wherein the processor attempts a call connection using a phone number when the detected object comprises the phone number.

11. A method for performing an operation corresponding to a user's selection command in a portable terminal device that interlocks with an external device, the method comprising:

performing communication with an external device;
receiving a moving image from the external device;
receiving an input of a selection command from a user;
displaying the received moving image;
capturing an image of the moving image at a time when the selection command is received;
detecting an object included in the captured image;
determining a type of the detected object;
in response to receiving the selection command, displaying:
the captured image in a first area of a display,
a task execution menu in a second area of the display, the task execution menu comprising a first menu corresponding to the detected type of the object and a second menu for storing the captured image, and the moving image in a third area of the display,
wherein, in response to receiving a command to select a portion of the moving image, the method further includes:
recognizing content in the selected portion of the moving image, transmitting a signal requesting data related to the recognized content to the external device,
receiving the data related to the recognized content from the external device, and
transmitting an instruction to the external device to perform an operation on the external device based on the received data and the recognized content,
wherein the operation comprises at least one of recording content via the external device or changing a channel of the external device, and
wherein, when an object related to a phone number is detected in the captured image according to the selection command, attempting a call connection using the phone number.

12. The method of claim 11, further comprising generating a captured image of the received moving image at the time when the selection command is received and storing the captured image when the selection command is received.

13. The method of claim 12, wherein the performing of the operation comprises displaying a task execution menu including the captured image and menus corresponding to at least one object included in the captured image on one area of a screen, and when one of the menus included in the task execution menu is selected, performing an operation corresponding to the selected menu.

14. The method of claim 13, wherein the performing of the operation comprises:
displaying the task execution menu including a search menu when a search window object is included in the captured image and displays a search screen when the search menu is selected,
displaying the task execution menu including a call connection menu when a phone number is included in the captured image and attempts a call connection using the phone number when the call connection menu is selected, and
displaying the task execution menu including a search menu for an image or a text when the image or the text of the search is included in the captured image, performing a search for the image or the text of the search, and displaying a result of the search when the search menu is selected.

15. The method of 12, further comprising displaying a plurality of pre-stored captured images on the screen when a stored image execution command is input, and displaying a task execution menu including the selected captured image and menus corresponding to at least one object included in the captured image on one area of a screen when one of the plurality of captured images is selected.

16. The method of claim 12, further comprising automatically deleting a captured image that exceeds a predetermined threshold period with reference to storage period information of pre-stored captured images.

17. A portable terminal device comprising:
a display;
a communicator configured to receive a moving picture displayed on an external device;
an inputter configured to receive an input of a user selection command; and
a processor configured to:
control the display to display the moving image received from the external device;
capture an image of the moving image at a time when the selection command is received,
detect an object included in the captured image,
determine a type of the detected object,
control the display to:
in response to receiving the selection command,
display the captured image in a first area of the display,
display a task execution menu in a second area of the display, the task execution menu comprising a first menu corresponding to the detected type of the object and a second menu for storing the captured image, and
display the moving image in a third area of the display,
wherein, in response to receiving a command to select a portion of the moving image, the processor is further configured to:
recognize content in the selected portion of the moving image,
transmit a signal requesting data related to the recognized content to the external device,
receive the data related to the recognized content from the external device, and
transmit an instruction to the external device to perform an operation on the external device based on the received data and the recognized content, and
wherein the operation comprises at least one of recording content via the external device or changing a channel of the external device.

18. The portable terminal device of claim 17,
wherein the captured image comprises a captured image of the received moving picture corresponding to a time when a selection command is through the inputter among pictures displayed on the external device, and
wherein the processor performs scaling of the captured image with a predetermined picture size.

19. The portable terminal device of claim 18,
wherein the task execution menu includes menus for performing execution and storage of the object selected by the user command, and
wherein the processor performs an operation corresponding to the selected menu when at least one of the menus included in the task execution menu is selected.

20. A method for performing an operation corresponding to a user's selection command in a portable terminal device that interlocks with an external device, the method comprising:
performing communication with an external device;
receiving a moving image from the external device;
receiving an input of a selection command from a user;
displaying the received moving image;
detecting an object;
determining a type of the detected object;
in response to receiving the selection command, displaying:
a captured image in a first area of a display,
a task execution menu in a second area of the display, the task execution menu comprising a first menu corresponding to the detected type of the object and a second menu for storing the captured image, and
the moving image in a third area of the display,
wherein, in response to receiving a command to select a portion of the moving image, the method further includes:
recognizing content in the selected portion of the moving image,
transmitting a signal requesting data related to the recognized content to the external device,
receiving the data related to the recognized content from the external device, and
transmitting an instruction to the external device to perform an operation on the external device based on the received data and the recognized content,
wherein the operation comprises at least one of recording content via the external device or changing a channel of the external device, and
wherein, when an object related to a phone number is detected in the captured image according to the selection command, attempting a call connection using the phone number.

21. The method of claim 20,
wherein the captured image comprises a captured image of the received moving picture corresponding to a time when the selection command is through the inputter among pictures displayed on the external device, and
wherein the displaying of the task execution menu performs scaling of the captured image with a predetermined picture size and displaying the scaled captured image.

22. The method of claim 21,
wherein the task execution menu includes menus for performing execution and storage of the object selected by the selection command, and
wherein the performing of the operation further comprises performing an operation corresponding to the selected menu when at least one of the menus included in the task execution menu is selected.

* * * * *